United States Patent
Mochizuki

(10) Patent No.: US 9,808,772 B2
(45) Date of Patent: Nov. 7, 2017

(54) GAS SEPARATION MEMBRANE AND GAS SEPARATION MEMBRANE MODULE

(71) Applicant: FUJIFILM Corporation, Tokyo (JP)

(72) Inventor: Yusuke Mochizuki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/244,181

(22) Filed: Aug. 23, 2016

(65) Prior Publication Data

US 2016/0354731 A1    Dec. 8, 2016

Related U.S. Application Data

(63) Continuation of application No. PCT/JP2015/055539, filed on Feb. 26, 2015.

(30) Foreign Application Priority Data

Feb. 28, 2014  (JP) .................................. 2014-038832

(51) Int. Cl.
*B01D 53/22* (2006.01)
*B01D 71/70* (2006.01)
(Continued)

(52) U.S. Cl.
CPC ........... *B01D 71/70* (2013.01); *B01D 53/228* (2013.01); *B01D 63/10* (2013.01); *B01D 69/148* (2013.01);
(Continued)

(58) Field of Classification Search
CPC ...... B01D 63/10; B01D 53/228; B01D 71/70; B01D 53/22; B01D 2325/30; B01D 69/148
See application file for complete search history.

(56) References Cited

U.S. PATENT DOCUMENTS 6,503,295 B1 * 1/2003 Koros .................. B01D 53/228
                                                        95/45
7,972,555 B2 * 7/2011 Polizzotti ................. C08J 9/365
                                                        166/280.1
(Continued)

FOREIGN PATENT DOCUMENTS

JP          03-262523 A      11/1991
JP            4551410 B2      9/2010
WO        2005/065152 A2      7/2005

OTHER PUBLICATIONS

International Preliminary Report on Patentability dated Sep. 15, 2016, issued in corresponding International Application No. PCT/JP2015/055539.
(Continued)

*Primary Examiner* — Anthony Shumate
(74) *Attorney, Agent, or Firm* — Sughrue Mion, PLLC

(57) ABSTRACT

Provided is a gas separation membrane including a support, a separation layer, and a protective layer in this order, in which the separation layer contains inorganic particles, the protective layer contains a resin and inorganic particles having an average particle diameter of 10 nm or greater which is less than 0.34 times the film thickness of the protective layer, and the content of the inorganic particles contained in the protective layer is 40% by mass or less with respect to the content of the resin contained in the protective layer, the gas separation membrane being capable of being made into a spiral type gas separation membrane module while maintaining high permeability; and a gas separation membrane module which uses the gas separation membrane.

10 Claims, 3 Drawing Sheets

(51) Int. Cl.
B01D 63/10 (2006.01)
B01D 69/14 (2006.01)

(52) U.S. Cl.
CPC .. *B01D 2256/245* (2013.01); *B01D 2257/504* (2013.01); *B01D 2325/30* (2013.01); *Y02C 10/10* (2013.01)

(56) References Cited

U.S. PATENT DOCUMENTS

| | | | | |
|---|---|---|---|---|
| 8,088,716 | B2* | 1/2012 | Polizzotti | C09K 8/03 428/402 |
| 2002/0051295 | A1* | 5/2002 | Oka | B29C 70/60 359/586 |
| 2002/0071867 | A1* | 6/2002 | Gebhard | C08J 5/18 424/486 |
| 2006/0147698 | A1* | 7/2006 | Carroll | A41D 31/0016 428/316.6 |
| 2008/0295692 | A1 | 12/2008 | Liu et al. | |
| 2009/0136802 | A1* | 5/2009 | Sasaki | H01M 8/0239 429/437 |
| 2011/0081586 | A1* | 4/2011 | McAlister | C25B 1/00 429/422 |
| 2012/0160095 | A1* | 6/2012 | Gin | B01D 53/22 95/45 |
| 2013/0026409 | A1* | 1/2013 | Baker | H01M 2/14 252/62.2 |
| 2013/0240369 | A1* | 9/2013 | McAlister | C25B 11/03 205/343 |
| 2014/0137740 | A1* | 5/2014 | Aburaya | B01D 53/22 96/13 |
| 2014/0319706 | A1* | 10/2014 | Huizing | B01D 53/228 261/102 |
| 2017/0182469 | A1* | 6/2017 | Mochizuki | B01D 71/70 |

OTHER PUBLICATIONS

International Search Report of PCT/JP2015/055539 dated Jun. 2, 2015 [PCT/ISA/210].
Written Opinion of PCT/JP2015/055539 dated Jun. 2, 2015 [PCT/ISA/237].

\* cited by examiner

GAS SEPARATION MEMBRANE AND GAS SEPARATION MEMBRANE MODULE

CROSS-REFERENCE TO RELATED APPLICATIONS

This application is a Continuation of PCT International Application No. PCT/JP2015/055539, filed on Feb. 26, 2015, which claims priority under 35 U.S.C. Section 119(a) to Japanese Patent Application No. 2014-038832 filed on Feb. 28, 2014. Each of the above applications is hereby expressly incorporated by reference, in its entirety, into the present application.

BACKGROUND OF THE INVENTION

1. Field of the Invention

The present invention relates to a gas separation membrane and a gas separation membrane module. More specifically, the present invention relates to a gas separation membrane which is capable of being made into a spiral type gas separation membrane module while maintaining high permeability and a gas separation membrane module which has the gas separation membrane.

2. Description of the Related Art

A material formed of a polymer compound has a gas permeability specific to the material. Based on this property, it is possible to cause selective permeation and separation out of a target gas component using a membrane formed of a specific polymer compound (gas separation membrane). As an industrial use aspect for this gas separation membrane related to the problem of global warming, separation and recovery from large-scale carbon dioxide sources with this gas separation membrane has been examined in thermal power plants, cement plants, or ironworks blast furnaces. Further, this membrane separation technique has been attracting attention as a means for solving environmental issues which can be achieved with relatively little energy. In addition, the technique is being used as a means for removing carbon dioxide from natural gas mainly including methane and carbon dioxide or biogas (biological excrement, organic fertilizers, biodegradable substances, sewage, garbage, fermented energy crops, or gas generated due to anaerobic digestion).

The following methods are known to be used for securing gas permeability and gas separation selectivity by making a site contributing to gas separation into a thin layer to be used as a practical gas separation membrane. A method of making a portion contributing to separation serving as an asymmetric membrane into a thin layer which is referred to as a skin layer, a method of using, as materials having mechanical strength, a support and a thin film composite provided with a selective layer contributing to gas separation which is disposed on the support, or a method of using hollow fibers including a layer which contributes to gas separation and has high density is known.

As typical performances of a gas separation membrane, a gas separation selectivity shown when a target gas is obtained from a mixed gas and a gas permeability of a target gas are exemplified. For the purpose of enhancing the gas permeability, gas separation membranes for which various materials are used have been examined.

For example, JP1991-262523A (JP-H03-262523A) describes a composite oxygen-enriching membrane formed by forming a specific oxygen permeating polymer membrane on at least one surface thereof using a polyorganosiloxane membrane that contains large silica zeolites as a support. Further, JP1991-262523A (JP-H03-262523A) describes that the oxygen permeating polymer membrane does not contain zeolites.

A molecular sieve is known as a compound having characteristics similar to those of zeolites. For example, paragraph [0048] and claim 15 of US2008-0295692A describe a method of providing a layer such as of polysiloxane or thermosetting silicone rubber on a mixed matrix membrane of a molecular sieve (molecular sieve polymer) that is functionalized by a polymer.

Moreover, JP4551410B describes that a mixed matrix membrane, which includes a continuous-phase organic polymer and a molecular sieve such as silicoalumino phosphate (SAPO) having a specific molar ratio of silica to alumina, is used as a gas separation membrane.

SUMMARY OF THE INVENTION

When the present inventor examined gas separation membranes described in JP1991-262523A (JP-H03-262523A), US2008-0295692A, and JP4551410B under such circumstances, it was found that the gas separation membranes become brittle and defects occur if the gas separation membranes are made into spiral type gas separation membrane modules (hereinafter, also referred to as "made into a spiral type module) in which multi-area gas separation membranes are squeezed into modules.

Further, in a membrane that contains inorganic particles such as zeolites of the gas separation membranes described in JP1991-262523A (JP-H03-262523A), US2008-0295692A, and JP4551410B, when the present inventor conducted intensive research, it was found that if the gas separation membranes are made into spiral type modules, if the content of the inorganic particles such as zeolites is reduced, the permeability of the gas separation membranes is degraded, while defects occur when the gas separation membranes are made into spiral type modules if the content of the inorganic particles such as zeolites is increased so that the permeability of the gas separation membranes resulting from the inorganic particles such as zeolites may be maintained.

An object of the present invention is to provide a gas separation membrane which is capable of being made into a spiral type gas separation membrane module while maintaining high permeability.

As a result of intensive research conducted by the present inventors in order to solve the above-described problems, it was found that brittleness of a gas separation membrane can be improved while maintaining high permeability and the gas separation membrane can be made into a spiral type gas separation membrane module by means of including a specific amount of inorganic particles having a specific particle diameter to be added to a protective layer when permeability is increased by adding inorganic particles such as zeolites to a separation layer provided on a support.

The present invention which is the specific means for solving the above-described problems is as follows.

[1] A gas separation membrane comprising: a support; a separation layer; and a protective layer in this order, in which the separation layer contains inorganic particles, the protective layer contains a resin and inorganic particles having an average particle diameter of 10 nm or greater which is less than 0.34 times the film thickness of the protective layer, and the content of the inorganic particles contained in the protective layer is 40% by mass or less with respect to the content of the resin contained in the protective layer.

[2] In the gas separation membrane according to [1], it is preferable that the inorganic particles contained in the separation layer are an inorganic molecular sieve.

[3] In the gas separation membrane according to [1] or [2], it is preferable that the content of the inorganic particles contained in the protective layer is in a range of 1% by mass to 40% by mass with respect to the content of the resin contained in the protective layer.

[4] In the gas separation membrane according to any one of [1] to [3], it is preferable that the inorganic particles contained in the separation layer are an inorganic molecular sieve.

[5] In the gas separation membrane according to any one of [1] to [4], it is preferable that the film thickness of the protective layer is 1000 nm or less.

[6] In the gas separation membrane according to any one of [1] to [5], it is preferable that the resin contained in the protective layer is polysiloxane.

[7] In the gas separation membrane according to any one of [1] to [6], it is preferable that the separation layer further includes a resin, and the content of the inorganic particles contained in the separation layer is in a range of 5% by mass to 40% by mass with respect to the content of the resin contained in the separation layer.

[8] It is preferable that the gas separation membrane according to any one of [1] to [7] further comprises a resin layer between the support and the separation layer, the resin layer contains a resin and inorganic particles having an average particle diameter of 10 nm or greater which is less than 0.34 times the film thickness of the resin layer, and the content of the inorganic particles contained in the resin layer is 40% by mass or less with respect to the content of the resin contained in the resin layer.

[9] A gas separation membrane module which uses the gas separation membrane according to any one of [1] to [8].

[10] It is preferable that the gas separation membrane module according to [9] is a spiral type gas separation membrane module.

According to the present invention, it is possible to provide a gas separation membrane which is capable of being made into a spiral type gas separation membrane module while maintaining high permeability.

Further, according to the present invention, it is possible to provide a gas separation membrane module using such a gas separation membrane.

DESCRIPTION OF THE PREFERRED EMBODIMENTS

Figure 1:
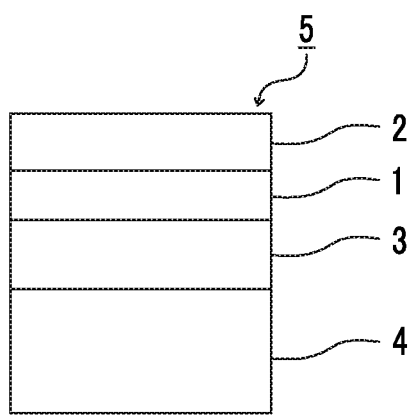
FIG. 1 is a view schematically illustrating an example of a gas separation membrane of the present invention.
Figure 2:
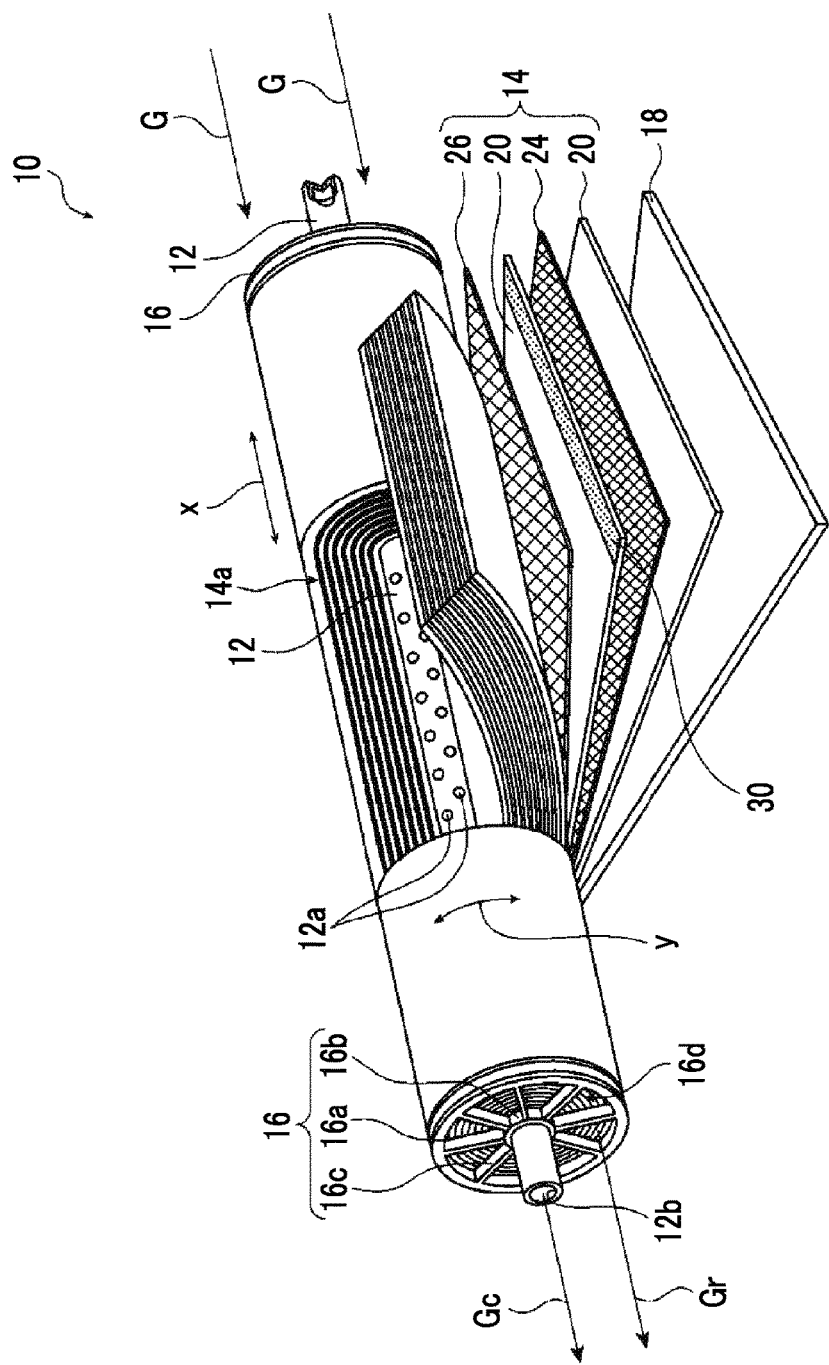
FIG. 2 is a view schematically illustrating an example of a spiral type gas separation membrane module of the present invention.
Figure 3:
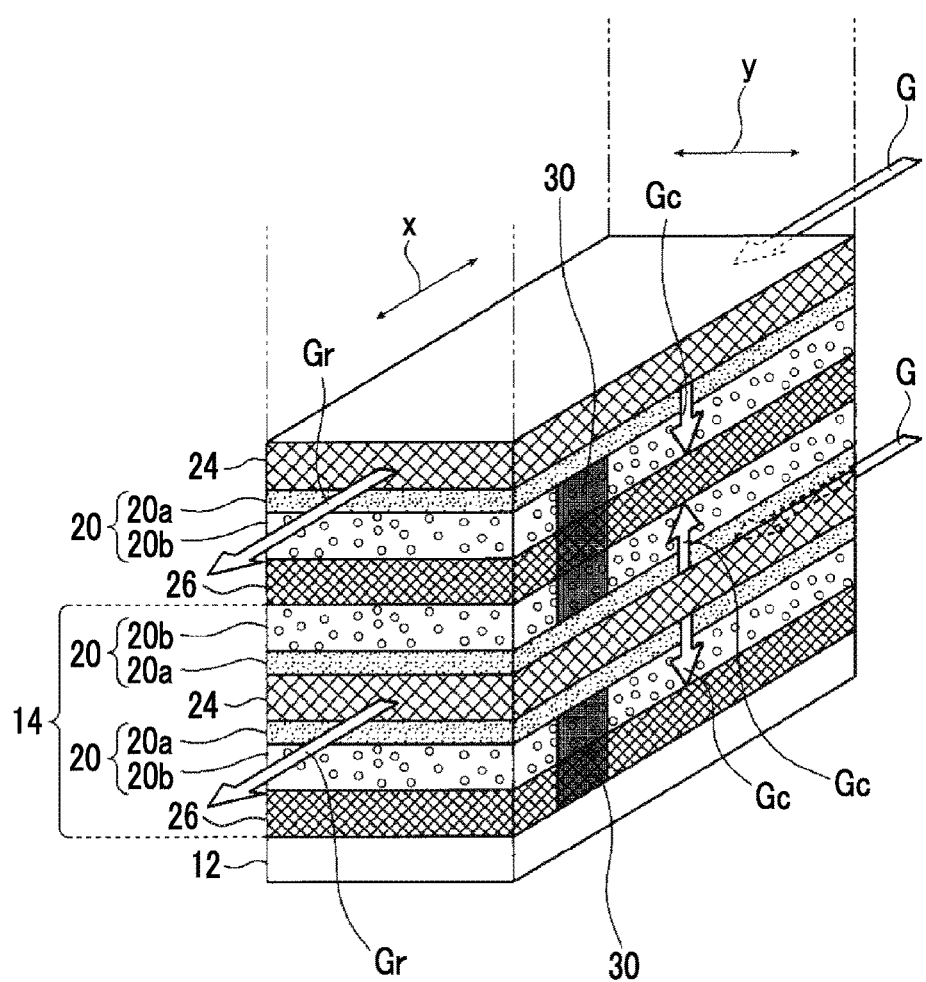
FIG. 3 is a view schematically illustrating an example of a section of the spiral type gas separation membrane module of the present invention.

Hereinafter, the present invention will be described in detail. The description of constituent elements described below is occasionally made based on the exemplary embodiments of the present invention, but the present invention is not limited to such embodiments. In addition, the numerical ranges shown using "to" in the present specification indicate ranges including the numerical values described before and after "to" as the lower limits and the upper limits.

In the present specification, when a plurality of substituent groups or linking groups (hereinafter, referred to as substituent groups or the like) shown by specific symbols are present or a plurality of substituent groups are defined simultaneously or alternatively, this means that the respective substituent groups may be the same as or different from each other. In addition, even in a case where not specifically stated, when a plurality of substituent groups or the like are adjacent to each other, they may be condensed or linked to each other and form a ring.

In regard to compounds (including resins) described in the present specification, the description includes salts thereof and ions thereof in addition to the compounds. Further, the description includes derivatives formed by changing a predetermined part within the range in which desired effects are exhibited.

A substituent group (the same applies to a linking group) in the present specification may include an optional substituent group of the group within the range in which desired effects are exhibited. The same applies to a compound in which substitution or non-substitution is not specified.

[Gas Separation Membrane]

A gas separation membrane of the present invention has a support, a separation layer, and a protective layer in this order. The separation layer contains inorganic particles, the protective layer contains a resin and inorganic particles having an average particle diameter of 10 nm or greater and being less than 0.34 times the film thickness of the protective layer, and the content of the inorganic particles contained in the protective layer is 40% by mass or less with respect to the content of the resin contained in the protective layer.

With such a configuration, the gas separation membrane of the present invention is capable of being made into a spiral type gas separation membrane module while maintaining high permeability. Not intended to adhere to any theory, but the reason why the gas separation membrane is capable of being made into a spiral type gas separation membrane module while maintaining high permeability with the above-described configuration may be simply described as follows.

A separation layer including inorganic particles is more brittle as the content of the inorganic particles is increased and a crack easily occurs at the time when the separation layer is bent. This is because adhesion at the interface between the inorganic particles and a binder used for the separation layer is weak and thus a crack easily occurs at the interface as a base point when the separation layer is bent. Further, since the inorganic particles are peeled off from the surface of the separation layer, the scratch resistance thereof is also degraded.

At this time, when a protective layer having excellent ductility is provided on the top of the separation layer, the protective layer suitably connects the particles to each other so that the occurrence of a crack at the time of the separation layer being bent can be prevented. Moreover, it is possible to prevent the inorganic particles from being peeled off from the surface thereof.

However, the protective layer is a layer resistant to permeation of gas and is desired to have a gas permeability higher than that of a typical separation layer. Polydimethylsiloxane is usually and preferably used as a protective layer, but the permeability becomes insufficient in a case where a separation layer having an extremely high gas permeability is used. For this reason, a protective layer having an excellent gas permeability and excellent ductility compared to other protective layers of the related art is required.

As a result of intensive research on the protective layer, it was confirmed that the above-described two conditions are desirably satisfied when the protective layer contains a resin and inorganic particles having an average particle diameter of 10 nm or greater which is less than 0.34 times the film thickness of the protective layer and the content of the inorganic particles contained in the protective layer is 40% by mass or less with respect to the content of the resin contained in the protective layer.

Hereinafter, preferred embodiments of the gas separation membrane of the present invention will be described.

<Configuration>

It is preferable that the gas separation membrane of the present invention is a thin film composite or an asymmetric membrane or is formed of hollow fibers.

Hereinafter, a case where the gas separation membrane is a thin film composite is occasionally described as a typical example, but the gas separation membrane of the present invention is not limited by the thin film composite.

A preferred configuration of the gas separation membrane of the present invention will be described with reference to the accompanying drawings. A gas separation membrane 5 of the present invention illustrated in FIG. 1 is a thin film composite and includes a support 4, a separation layer 1, and a protective layer 2 in this order.

It is preferable that the gas separation membrane 5 of the present invention includes a resin layer 3 between the separation layer 1 and the support 4.

Here, the resin layer 3 may be formed of two or more layers being laminated on each other.

The expression an optional layer is provided "on the support" in the present specification means that another layer may be interposed between the support and the optional layer. Further, in regard to the expressions related to up and down, the direction in which gas to be separated is supplied to is set as "up" and the direction in which the separated gas is discharged is set as "down" in the gas separation membrane 5 of FIG. 1 unless otherwise specified.

<Protective Layer>

The gas separation membrane of the present invention includes a support, a separation layer, and a protective layer in this order. That is, the gas separation membrane includes the protective layer formed on the separation layer. The protective layer is a layer disposed on the separation layer. At the time of handling or use, unintended contact between the separation layer and other materials can be prevented by providing the protective layer on the separation layer.

In the gas separation membrane of the present invention, the protective layer contains a resin and inorganic particles having an average particle diameter of 10 nm or greater which is less than 0.34 times the film thickness of the protective layer, and the content of the inorganic particles contained in the protective layer is 40% by mass or less with respect to the content of the resin contained in the protective layer.

(Inorganic Particles)

The above-described inorganic particles contained in the protective layer have an average particle diameter of 10 nm or greater which is less than 0.34 times the film thickness of the protective layer.

The average particle diameter of the above-described inorganic particles contained in the protective layer is preferably 10 nm or greater and more preferably 13 nm or greater. The average particle diameter thereof is preferably 0.001 times or greater the film thickness of the protective layer and more preferably 0.01 times or greater the film thickness of the protective layer.

The average particle diameter of the above-described inorganic particles contained in the protective layer is preferably less than 0.34 times the film thickness of the protective layer and more preferably less than 0.30 times the film thickness of the protective layer.

As the above-described inorganic particles contained in the protective layer, inorganic particles having pores are preferable and examples thereof include inorganic molecular sieve particles and silica particles.

In the present specification, the inorganic molecular sieve indicates a porous inorganic material and a porous inorganic material formed to have a pallet shape or a powder shape is well-known, and examples thereof include zeolites such as aluminosilicate and metallosilicate; particles of a similar-substance to zeolite such as aluminophosphate (AlPO), silicoalumino phosphate (SAPO), metallo-alumino phosphate (MeAPO), element alumino phosphate (ElAPO), metallo-silicoalumino phosphate (MeAPSO), and elemental silicoalumino phosphate (ElAPSO); and other inorganic molecular sieves such as a carbon molecular sieve (CMS). However, the examples are not limited to these.

The zeolite is described in detail in, for example, "Science and Engineering of Zeolite" (edited by Tatsuaki Yashima and Yoshio Ono, Kodansha Scientific Ltd., published on July 2000) and indicates hydrous tectosilicate which has an aluminosilicate tetrahedral skeleton structure, ion-exchangeable large cations, and water molecules that are capable of reversible dehydration and are loosely held. The zeolites contain porous crystalline aluminosilicate and porous crystalline metallosilicate. The metallosilicate has a crystal structure which is the same as that of the aluminosilicate.

The similar substance to a zeolite indicates a porous crystal having a structure similar to that of a zeolite other than porous crystalline aluminosilicate and porous crystalline metallosilicate. Among the examples of the similar substance to a zeolite, a similar substance to a phosphate-based zeolite is preferable.

From the viewpoints of particle diameter and durability, it is preferable that the above-described inorganic particles contained in the protective layer are formed of an inorganic molecular sieve, more preferable that the inorganic particles are formed of zeolites or a similar substance to a zeolite, and particularly preferable that the inorganic particles are formed of a similar substance to a zeolite.

Preferred examples of the inorganic molecular sieve include aluminosilicate (zeolite); a similar substance to a phosphate-based zeolite such as aluminophosphate (AlPO), silicoalumino phosphate (SAPO), metallo-alumino phosphate (MeAPO), element alumino phosphate (ElAPO), metallo-silicoalumino phosphate (MeAPSO), and elemental silicoalumino phosphate (ElAPSO); and a carbon molecular sieve (CMS). Among these, AlPO, SAPO, or a carbon molecular sieve is preferable, SAPO or AlPO is more preferable, and SAPO is particularly preferable.

Examples of the zeolite include zeolites having structures of International Zeolite Association (IZA) such as a CHA type zeolite, an NAT type zeolite, an FAU type zeolite, an MOR type zeolite, an MFI type zeolite, a BEA type zeolite, an RHO type zeolite, an ANA type zeolite, an ERI type zeolite, a GIS type zeolite, an LTA type zeolite, and an AFI type zeolite, but the examples are not limited to these. Among these, a CHA type zeolite or an MFI type zeolite is preferable and a CHA type is more preferable.

In the present invention, the CHA type zeolite indicates a zeolite having a CHA structure in a code in which the structure of zeolite determined by International Zeolite Association (IZA) is defined. The CHA type zeolite is a zeolite having a crystal structure similar to that of chabazite that is naturally produced. The CHA type zeolite has a structure with a three-dimensional pore formed of an oxygen 8-membered ring having a diameter of 0.38×0.38 nm and the structure thereof is characterized by X-ray diffraction data.

In AlPO, examples thereof having structures of International Zeolite Association (IZA) include CHA type AlPO, NAT type AlPO, FAU type AlPO, MOR type AlPO, MFI type AlPO, BEA type AlPO, RHO type AlPO, ANA type AlPO, ERI type AlPO, GIS type AlPO, LTA type AlPO, and AFI type AlPO, but the examples are not limited to these. Among these, CHA type AlPO or LTA type AlPO is preferable and CHA type AlPO is more preferable.

In SAPO, examples thereof having structures of International Zeolite Association (IZA) include CHA type SAPO, NAT type SAPO, FAU type SAPO, MOR type SAPO, MFI type SAPO, BEA type SAPO, RHO type SAPO, ANA type SAPO, ERI type SAPO, GIS type SAPO, LTA type SAPO, and AFI type SAPO, but the examples are not limited to these. Among these, CHA type SAPO or LTA type SAPO is preferable and CHA type SAPO is more preferable.

Among silica particles, mesoporous silica which is a mesoporous material is preferable as the inorganic particles contained in the protective layer. A mesoporous material having a pore size of 2 nm to 50 nm is preferable.

The pore size of the above-described inorganic particles contained in the protective layer is preferably in a range of 0.34 nm to 0.40 nm and more preferably in a range of 0.35 nm to 0.39 nm.

Preferred specific examples of the above-described inorganic particles contained in the protective layer include silicalite-1, CHA type aluminophosphate such as SAPO-34, Si-DDR, AlPO-14, AlPO-34, AlPO-18, SSZ-62, UZM-5, UZM-25, UZM-12, UZM-9, or AlPO-17, and CHA type aluminosilicate such as SSZ-13, SSZ-16, ERS-12, CDS-1, MCM-65, MCM-47, 4A, 5A, SAPO-44, SAPO-47, SAPO-17, CVX-7, SAPO-35, SAPO-56, AlPO-52, or SAPO-43. Among these, SAPO-34, SSZ-13, and AlPO-18 are more preferable and SAPO-34 is particularly preferable.

In the present invention, the content of the above-described inorganic particles contained in the protective layer is preferably 40% by mass or less, more preferably in a range of 1% by mass to 40% by mass, particularly preferably in a range of 5% by mass to 40% by mass, and more particularly preferably in a range of 10% by mass to 40% by mass with respect to the resin in the protective layer.

(Resin)

The preferable range of the resin used for the protective layer is the same as that of a preferable resin used for a resin layer described below. Particularly, it is preferable that the protective layer is polysiloxane or polyethylene oxide, more preferable that the protective layer is at least one selected from polydimethylsiloxane (hereinafter, also referred to as PDMS), poly(1-trimethylsilyl-1-propyne) (hereinafter, also referred to as PTMSP), and polyethylene oxide, particularly preferable that the protective layer is polydimethylsiloxane or poly(1-trimethylsilyl-1-propyne), and more particularly preferable that the protective layer is polydimethylsiloxane.

(Characteristics)

The film thickness of the protective layer is preferably 1000 nm or less, more preferably in a range of 20 nm to 1000 nm, still more preferably in a range of 20 nm to 900 nm, and particularly preferably in a range of 30 nm to 800 nm.

<Separation Layer>

In the present invention, the separation layer contains inorganic particles.

The expression "having gas separation selectivity" in the present invention means that a ratio ($PCO_2/PCH_4$) of a permeability coefficient ($PCO_2$) of carbon dioxide to a permeability coefficient ($PCH_4$) of methane is 1.5 or greater when pure gas of carbon dioxide ($CO_2$) and methane ($CH_4$) is supplied by forming a membrane having a thickness of 1 μm to 30 μm and setting the temperature thereof to 40° C. and the total pressure on the gas supply side to 0.5 MPa with respect to the obtained membrane.

(Inorganic Particles)

In the present invention, the content of the above-described inorganic particles contained in the separation layer is in a range of 5% by mass to 40% by mass, particularly preferably in a range of 10% by mass to 40% by mass, and more particularly preferably in a range of 20% by mass to 40% by mass with respect to the content of the resin contained in the separation layer.

Inorganic particles having pores are preferable as the above-described inorganic particles contained in the separation layer, and examples thereof include silica particles and inorganic molecular sieve particles.

From the viewpoints of gas permeability, durability, and the particle diameter, it is preferable that the above-described inorganic particles contained in the separation layer are inorganic molecular sieve particles, more preferable that the inorganic particles are formed of zeolites or a similar substance to a zeolite, and particularly preferable that the inorganic particles are formed of a similar substance to a zeolite.

The preferable ranges of the silica particles and the inorganic molecular sieve particles which can be used in the separation layer are the same as the preferable ranges of the silica particles and the inorganic molecular sieve particles which can be used in the protective layer.

The preferable range of the pore size of the above-described inorganic particles contained in the separation layer is the same as that the preferable range of the pore size of the above-described inorganic particles contained in the protective layer.

The preferable range of the average particle diameter of the above-described inorganic particles contained in the separation layer is the same as that the preferable range of the average particle diameter of the above-described inorganic particles contained in the protective layer.

The relationship between the average particle diameter of the above-described inorganic particles contained in the separation layer and the film thickness of the separation layer is not particularly limited, but the average particle diameter of the above-described inorganic particles contained in the separation layer is preferably in a range of 0.01 times to 0.95 times the film thickness of the separation layer, more preferably in a range of 0.02 times to 0.90 times the film thickness of the separation layer, and particularly preferably in a range of 0.04 times to 0.90 times the film thickness of the separation layer.

Preferred specific examples of the above-described inorganic particles contained in the separation layer include silicalite-1, CHA type aluminophosphate such as SAPO-34, Si-DDR, AlPO-14, AlPO-34, AlPO-18, SSZ-62, UZM-5, UZM-25, UZM-12, UZM-9, or AlPO-17, and CHA type aluminosilicate such as SSZ-13, SSZ-16, ERS-12, CDS-1, MCM-65, MCM-47, 4A, 5A, SAPO-44, SAPO-47, SAPO-17, CVX-7, SAPO-35, SAPO-56, AlPO-52, or SAPO-43.

Among these, SAPO-34, SSZ-13, and AlPO-18 are more preferable and SAPO-34 is particularly preferable.

(Resin)

In the present invention, it is preferable that the separation layer further includes a resin.

Examples of the resin which can be used for the separation layer are described below, but are not limited thereto. Specifically, polyimides, polyamides, celluloses, polyethylene glycols, and polybenzoxazoles are preferable, at least one selected from polyimide, polybenzoxazole, and acetic acid cellulose is more preferable, and polyimide is particularly preferable.

It is preferable that polyimide has a reactive group.

Hereinafter, a case where the resin of the separation layer is polyimide having a reactive group will be described as a typical example, but the present invention is not limited to the case where a polymer having a reactive group is polyimide having a reactive group.

The polyimide having a reactive group which can be used in the present invention will be described below in detail.

According to the present invention, in a polyimide compound having a reactive group, it is preferable that a polymer having a reactive group includes a polyimide unit and a repeating unit having a reactive group (preferably a nucleophilic reactive group and more preferably a carboxyl group, an amino group, or a hydroxyl group) on the side chain thereof.

More specifically, it is preferable that the polymer having a reactive group includes at least one repeating unit represented by the following Formula (I) and at least one repeating unit represented by the following Formula (III-a) or (III-b).

Further, it is more preferable that the polymer having a reactive group includes at least one repeating unit represented by the following Formula (I), at least one repeating unit represented by the following Formula (II-a) or (II-b), and at least one repeating unit represented by the following Formula (III-a) or (III-b).

The polyimide having a reactive group which can be used in the present invention may include repeating units other than the respective repeating units described above, and the number of moles thereof is preferably 20 or less and more preferably in a range of 0 to 10 when the total number of moles of the respective repeating units represented by each of the above-described formulae is set to 100. It is particularly preferable that the polyimide having a reactive group which can be used in the present invention is formed of only the respective repeating units represented by each of the following formulae.

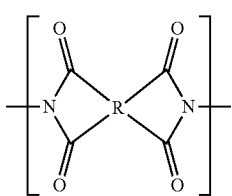

Formula (I)

In Formula (I), R represents a group having a structure represented by any of the following Formulae (I-a) to (I-h). In the following Formulae (I-a) to (I-h), the symbol "*" represents a binding site with respect to a carbonyl group of Formula (I). R in Formula (I) is occasionally referred to as a mother nucleus, and it is preferable that this mother nucleus R is a group represented by Formula (I-a), (I-b), or (I-d), more preferable that this mother nucleus R is a group represented by Formula (I-a) or (I-d), and particularly preferable that this mother nucleus R is a group represented by Formula (I-a).

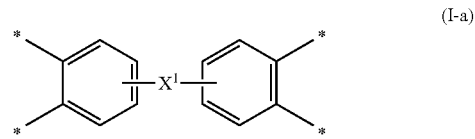

(I-a)

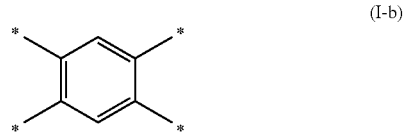

(I-b)

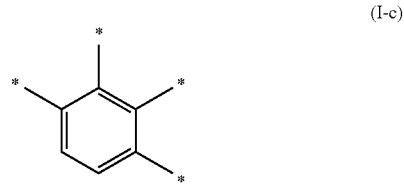

(I-c)

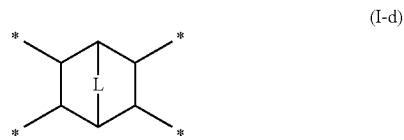

(I-d)

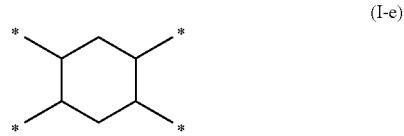

(I-e)

(I-f)

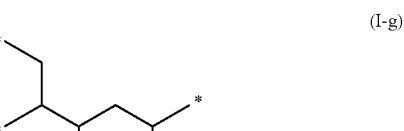

(I-g)

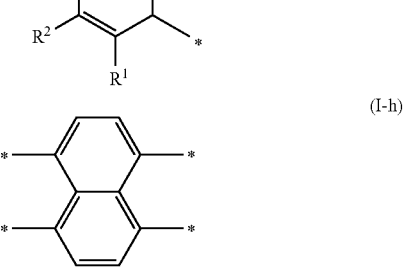

(I-h)

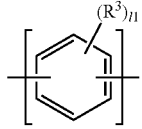

Formula (II-a)

-continued

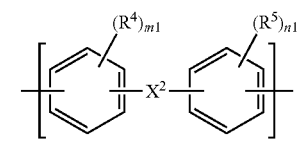

Formula (II-b)

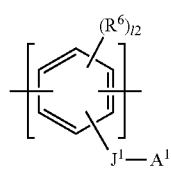

Formula (III-a)

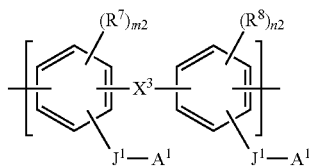

Formula (III-b)

$X^1$, $X^2$, and $X^3$ $X^1$, $X^2$, and $X^3$ represent a single bond or a divalent linking group. As the divalent linking group, $-C(R^X)_2-$ ($R^X$ represents a hydrogen atom or a substituent group. In a case where $R^X$ represents a substituent group, $R^X$'s may be linked to each other and form a ring), $-O-$, $-SO_2-$, $-C(=O)-$, $-S-$, $-NR^Y-$ ($R^Y$ represents a hydrogen atom, an alkyl group (preferably a methyl group or an ethyl group), or an aryl group (preferably a phenyl group)), or a combination of these is preferable and a single bond or $-C(R^X)_2-$ is more preferable. When $R^X$ represents a substituent group, a group Z of substituent groups described below is specifically exemplified. Among these, an alkyl group is preferable, an alkyl group having a halogen atom as a substituent group is more preferable, and trifluoromethyl is particularly preferable. Further, in regard to the expression "may be linked to each other and form a ring" in the present specification, the linkage may be made by a single bond or a double bond and then a cyclic structure may be formed or condensation may be made and then a condensed ring structure may be formed.

L

L represents $-CH_2=CH_2-$ or $-CH_2-$ and $-CH_2=CH_2-$ is preferable.

$R^1$ and $R^2$ $R^1$ and $R^2$ represent a hydrogen atom or a substituent group. As the substituent group, any one selected from the group Z of substituent groups described below can be used. $R^1$ and $R^2$ may be bonded to each other and form a ring.

$R^1$ and $R^2$ preferably represent a hydrogen atom or an alkyl group, more preferably represent a hydrogen atom, a methyl group, or an ethyl group, and still more preferably represent a hydrogen atom.

$R^3$ $R^3$ represents an alkyl group or a halogen atom. The preferable ranges of the alkyl group and the halogen atom are the same as those of an alkyl group and a halogen atom defined in the group Z of substituent groups described below. l1 showing the number of $R^3$'s represents an integer of 0 to 4, is preferably in a range of 1 to 4, and is more preferably 3 or 4. It is preferable that $R^3$ represents an alkyl group and more preferable that $R^3$ represents a methyl group or an ethyl group.

$R^4$ and $R^5$ $R^4$ and $R^5$ represent an alkyl group or a halogen atom or a group in which $R^4$ and $R^5$ are linked to each other and form a ring together with $X^2$. The preferable ranges of the alkyl group and the halogen atom are the same as those of an alkyl group and a halogen atom defined in the group Z of substituent groups described below. The structure formed by $R^4$ and $R^5$ being linked to each other is not particularly limited, but it is preferable that the structure is a single bond, $-O-$, or $-S-$. m1 and n1 respectively showing the numbers of $R^4$'s and $R^5$'s represent an integer of 0 to 4, are preferably in a range of 1 to 4, and are more preferably 3 or 4.

In a case where $R^4$ and $R^5$ represent an alkyl group, it is preferable that $R^4$ and $R^5$ represent a methyl group or an ethyl group and also preferable that $R^4$ and $R^5$ represent trifluoromethyl.

$R^6$, $R^7$, and $R^8$ $R^6$, $R^7$, and $R^8$ represent a substituent group. Here, $R^7$ and $R^8$ may be bonded to each other and form a ring. l2, m2, and n2 respectively showing the numbers of these substituents represent an integer of 0 to 4, are preferably in a range of 0 to 2, and are more preferably 0 or 1.

$J^1$

J1 represents a single bond or a divalent linking group. As the linking group, $*-COO^{-1}N^+R^bR^cR^d-**$ ($R^b$ to $R^d$ represent a hydrogen atom, an alkyl group, or an aryl group, and preferable ranges thereof are respectively the same as those described in the group Z of substituent groups described below), $*-SO_3^-N^+R^eR^fR^g-**$ ($R^e$ to $R^g$ represent a hydrogen atom, an alkyl group, or an aryl group, and preferable ranges thereof are respectively the same as those described in the group Z of substituent groups described below), an alkylene group, or an arylene group is exemplified. The symbol "*" represents a binding site on the phenylene group side and the symbol "**" represents a binding site on the opposite side of the phenylene group. It is preferable that $J^1$ represents a single bond, a methylene group, or a phenylene group and a single bond is particularly preferable.

$A^1$ $A^1$ is not particularly limited as long as $A^1$ represents a group in which a crosslinking reaction may occur, but it is preferable that $A^1$ represents a nucleophilic reactive group and more preferable that $A^1$ represents a group selected from a carboxyl group, an amino group, a hydroxyl group, and $-S(=O)_2OH$. The preferable range of the amino group is the same as the preferable range of the amino group described in the group Z of substituent groups below. $A^1$ represents particularly preferably a carboxyl group, an amino group, or a hydroxyl group, more particularly preferably a carboxyl group or a hydroxyl group, and still more particularly preferably a carboxyl group.

Examples of the group Z of substituent groups include:

an alkyl group (the number of carbon atoms of the alkyl group is preferably in a range of 1 to 30, more preferably in a range of 1 to 20, and particularly preferably in a range of 1 to 10, and examples thereof include methyl, ethyl, isopropyl, tert-butyl, n-octyl, n-decyl, and n-hexadecyl), a cycloalkyl group (the number of carbon atoms of the cycloalkyl group is preferably in a range of 3 to 30, more preferably in a range of 3 to 20, and particularly preferably in a range of 3 to 10, and examples thereof include cyclopropyl, cyclopentyl, and cyclohexyl), an alkenyl group (the number of carbon atoms of the alkenyl group is preferably in a range of 2 to 30, more preferably in a range of 2 to 20, and particularly preferably in a range of 2 to 10, and examples thereof include vinyl, allyl, 2-butenyl, and 3-pentenyl), an alkynyl group (the number of carbon atoms of the alkynyl group is preferably in a range of 2 to 30, more preferably in a range of 2 to 20, and particularly preferably in a range of 2 to 10, and examples thereof include propargyl and 3-pentynyl), an aryl group (the number of carbon atoms of the aryl group is preferably in a range of 6 to 30, more preferably in a range of 6 to 20, and particularly preferably in a range of 6 to 12, and examples thereof include phenyl, p-methylphenyl, naphthyl, and anthranyl), an amino group (such as an amino group, an alkylamino group, an arylamino group, or a heterocyclic amino group; the number of carbon atoms of the amino group is preferably in a range of 0 to 30, more preferably in a range of 0 to 20, and particularly preferably in a range of 0 to 10 and examples thereof include amino, methylamino, dimethylamino, diethylamino, dibenzylamino, diphenylamino, and ditolylamino), an alkoxy group (the number of carbon atoms of the alkoxy group is preferably in a range of 1 to 30, more preferably in a range of 1 to 20, and particularly preferably in a range of 1 to 10, and examples thereof include methoxy, ethoxy, butoxy, and 2-ethylhexyloxy), an aryloxy group (the number of carbon atoms of the aryloxy group is preferably in a range of 6 to 30, more preferably in a range of 6 to 20, and particularly preferably in a range of 6 to 12, and examples thereof include phenyloxy, 1-naphthyloxy, and 2-naphthyloxy), a heterocyclic oxy group (the number of carbon atoms of the heterocyclic oxy group is preferably in a range of 1 to 30, more preferably in a range of 1 to 20, and particularly preferably in a range of 1 to 12, and examples thereof include pyridyloxy, pyrazyloxy, pyrimidyloxy, and quinolyloxy), an acyl group (the number of carbon atoms of the acyl group is preferably in a range of 1 to 30, more preferably in a range of 1 to 20, and particularly preferably in a range of 1 to 12, and examples thereof include acetyl, benzoyl, formyl, and pivaloyl), an alkoxycarbonyl group (the number of carbon atoms of the alkoxycarbonyl group is preferably in a range of 2 to 30, more preferably in a range of 2 to 20, and particularly preferably in a range of 2 to 12, and examples thereof include methoxycarbonyl and ethoxycarbonyl), an aryloxycarbonyl group (the number of carbon atoms of the aryloxycarbonyl group is preferably in a range of 7 to 30, more preferably in a range of 7 to 20, and particularly preferably in a range of 7 to 12, and examples thereof include phenyloxycarbonyl), an acyloxy group (the number of carbon atoms of the acyloxy group is preferably in a range of 2 to 30, more preferably in a range of 2 to 20, and particularly preferably in a range of 2 to 10, and examples thereof include acetoxy and benzoyloxy), an acylamino group (the number of carbon atoms of the acylamino group is preferably in a range of 2 to 30, more preferably in a range of 2 to 20, and particularly preferably in a range of 2 to 10, and examples thereof include acetylamino and benzoylamino), an alkoxycarbonylamino group (the number of carbon atoms of the alkoxycarbonylamino group is preferably in a range of 2 to 30, more preferably in a range of 2 to 20, and particularly preferably in a range of 2 to 12, and examples thereof include methoxycarbonylamino), an aryloxycarbonylamino group (the number of carbon atoms of the aryloxycarbonylamino group is preferably in a range of 7 to 30, more preferably in a range of 7 to 20, and particularly preferably in a range of 7 to 12, and examples thereof include phenyloxycarbonylamino), a sulfonylamino group (the number of carbon atoms of the sulfonylamino group is preferably in a range of 1 to 30, more preferably in a range of 1 to 20, and particularly preferably in a range of 1 to 12, and examples thereof include methanesulfonylamino and benzenesulfonylamino), a sulfamoyl group (the number of carbon atoms of the sulfamoyl group is preferably in a range of 0 to 30, more preferably in a range of 0 to 20, and particularly preferably in a range of 0 to 12, and examples thereof include sulfamoyl, methylsulfamoyl, dimethylsulfamoyl, and phenylsulfamoyl), a carbamoyl group (the number of carbon atoms of the carbamoyl group is preferably in a range of 1 to 30, more preferably in a range of 1 to 20, and particularly preferably in a range of 1 to 12, and examples thereof include carbamoyl, methyl carbamoyl, diethyl carbamoyl, and phenyl carbamoyl), an alkylthio group (the number of carbon atoms of the alkylthio group is preferably in a range of 1 to 30, more preferably in a range of 1 to 20, and particularly preferably in a range of 1 to 12, and examples thereof include methylthio and ethylthio), an arylthio group (the number of carbon atoms of the arylthio group is preferably in a range of 6 to 30, more preferably in a range of 6 to 20, and particularly preferably in a range of 6 to 12, and examples thereof include phenylthio), a heterocyclic thio group (the number of carbon atoms of the heterocyclic thio group is preferably in a range of 1 to 30, more preferably in a range of 1 to 20, and particularly preferably in a range of 1 to 12, and examples thereof include pyridylthio, 2-benzimidazolylthio, 2-benzoxazolylthio, and 2-benzothiazolylthio), a sulfonyl group (the number of carbon atoms of the sulfonyl group is preferably in a range of 1 to 30, more preferably in a range of 1 to 20, and particularly preferably in a range of 1 to 12, and examples thereof include mesyl and tosyl), a sulfinyl group (the number of carbon atoms of the sulfinyl group is preferably in a range of 1 to 30, more preferably in a range of 1 to 20, and particularly preferably in a range of 1 to 12, and examples thereof include methanesulfinyl and benzenesulfinyl), an ureido group (the number of carbon atoms of the ureido group is preferably in a range of 1 to 30, more preferably in a range of 1 to 20, and particularly preferably in a range of 1 to 12, and examples thereof include ureido, methylureido, and phenylureido), a phosphoric acid amide group (the number of carbon atoms of the phosphoric acid amide group is preferably in a range of 1 to 30, more preferably in a range of 1 to 20, and particularly preferably in a range of 1 to 12, and examples thereof include diethyl phosphoric acid amide and phenyl phosphoric acid amide), a hydroxy group, a mercapto group, a halogen atom (such as a fluorine atom, a chlorine atom, a bromine atom, or an iodine atom, and a fluorine atom is more preferable), a cyano group, a sulfo group, a carboxyl group, an oxo group, a nitro group, a hydroxamic acid group, a sulfino group, a hydrazino group, an imino group, a heterocyclic group (a 3- to 7-membered ring heterocyclic group is preferable, the hetero ring may be aromatic or non-aromatic, examples of a heteroatom constituting the hetero ring include a nitrogen atom, an oxygen atom, and a sulfur atom, the number of carbon atoms of the heterocyclic group is preferably in a range of 0 to 30 and more preferably in a range of 1 to 12, and specific examples thereof include imidazolyl, pyridyl, quinolyl, furyl, thienyl, piperidyl, morpholino, benzoxazolyl, benzimidazolyl, benzothiazolyl, carbazolyl, and azepinyl), a silyl group (the number of carbon atoms of the silyl group is preferably in a range of 3 to 40, more preferably in a range of 3 to 30, and particularly preferably in a range of 3 to 24, and examples thereof include trimethylsilyl and triphenylsilyl), and a silyloxy group (the number of carbon atoms of the silyloxy group is preferably in a range of 3 to 40, more preferably in a range of 3 to 30, and particularly preferably in a range of 3 to 24, and examples thereof include trimethylsilyloxy and triphenylsilyloxy). These substituent groups may be substituted with any one or more substituent groups selected from the group Z of substituent groups.

Further, in the present invention, when a plurality of substituent groups are present at one structural site, these substituent groups may be linked to each other and form a ring or may be condensed with some or entirety of the structural site and form an aromatic ring or an unsaturated hetero ring.

In the polyimide compound which can be used in the present invention, the ratios of the respective repeating units represented by Formulae (I), (II-a), (II-b), (III-a), and (III-b) are not particularly limited and appropriately adjusted in consideration of gas permeability and separation selectivity according to the purpose of gas separation (recovery rate, purity, or the like).

In the polyimide having a reactive group which can be used in the present invention, a ratio ($E_{II}/E_{III}$) of the total number ($E_{II}$) of moles of respective repeating units represented by Formulae (II-a) and (II-b) to the total number ($E_{III}$) of moles of respective repeating units represented by Formulae (III-a) and (III-b) is preferably in a range of 5/95 to 95/5, more preferably in a range of 10/90 to 80/20, and still more preferably in a range of 20/80 to 60/40.

The molecular weight of the polyimide having a reactive group which can be used in the present invention is preferably in a range of 10,000 to 1,000,000, more preferably in a range of 15,000 to 500,000, and still more preferably in a range of 20,000 to 200,000 as the weight average molecular weight.

The molecular weight and the dispersity in the present specification are set to values measured using a gel permeation chromatography (GPC) method unless otherwise specified and the molecular weight is set to a weight average molecular weight in terms of polystyrene. A gel including an aromatic compound as a repeating unit is preferable as a gel filled into a column used for the GPC method and a gel formed of a styrene-divinylbenzene copolymer is exemplified. It is preferable that two to six columns are connected to each other and used. Examples of a solvent to be used include an ether-based solvent such as tetrahydrofuran and an amide-based solvent such as N-methylpyrrolidinone. It is preferable that measurement is performed at a flow rate of the solvent of 0.1 mL/min to 2 mL/min and most preferable that the measurement is performed at a flow rate thereof of 0.5 mL/min to 1.5 mL/min. When the measurement is performed in the above-described range, a load is not applied to the apparatus and the measurement can be more efficiently performed. The measurement temperature is preferably in a range of 10° C. to 50° C. and most preferably in a range of 20° C. to 40° C. In addition, the column and the carrier to be used can be appropriately selected according to the physical properties of a polymer compound which is a target for measurement.

The polyimide having a reactive group which can be used in the present invention can be synthesized by performing condensation and polymerization of a specific bifunctional acid anhydride (tetracarboxylic dianhydride) and a specific diamine. As the method, a technique described in a general book (for example, "*The Latest Polyimide~Fundamentals and Applications~*" edited by Toshio Iwai and Rikio Yokota, NTS Inc., pp. 3 to 49) can be appropriately selected.

Preferred specific examples of the polyimide having a reactive group which can be used in the present invention will be described below, but the present invention is not limited thereto. Further, "100," "x," and "y" in the following formulae indicate a copolymerization ratio (molar ratio). Examples of "x," "y," and the weight average molecular weight are listed in the following Table 1. Moreover, in the polyimide compound which can be used in the present invention, it is preferable that y does not represent 0.

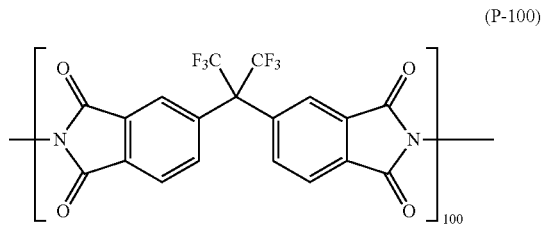

(P-100)

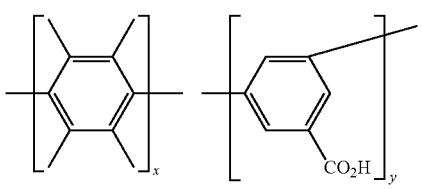

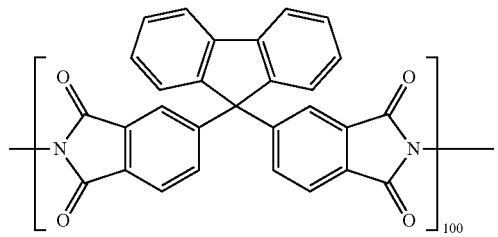

(P-200)

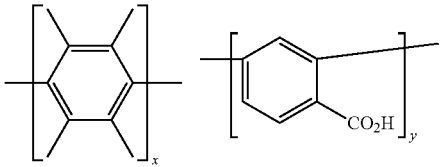

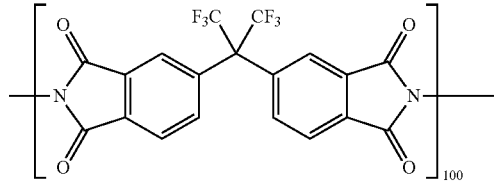

(P-300)

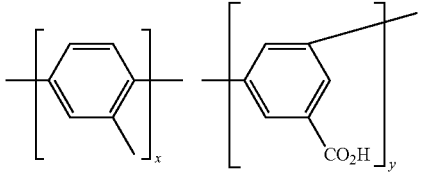

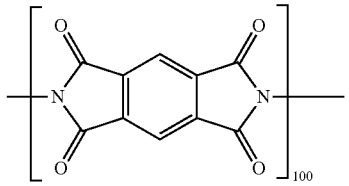

(P-400)

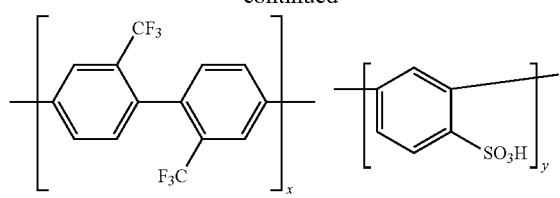
(P-500)
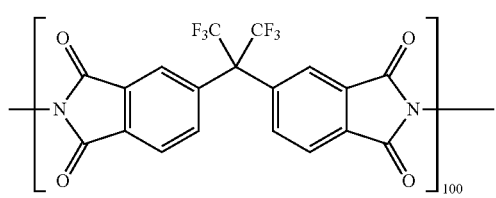
(P-600)
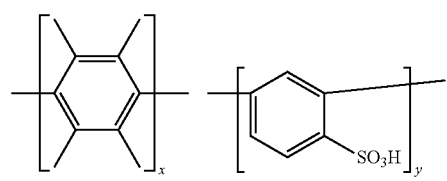
(P-700)
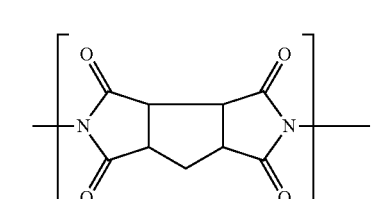
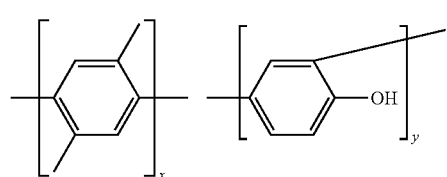
(P-800)
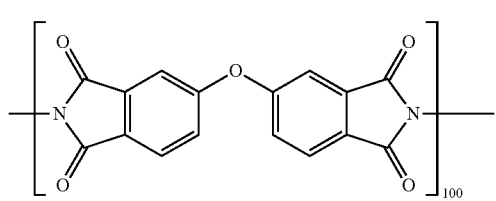
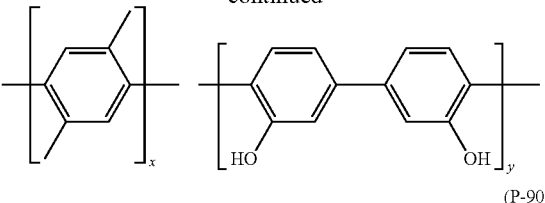
(P-900)
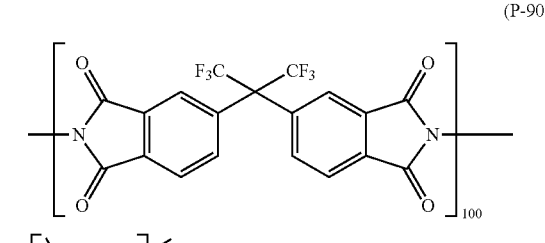
(P-1000)
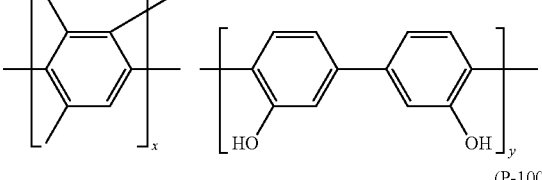
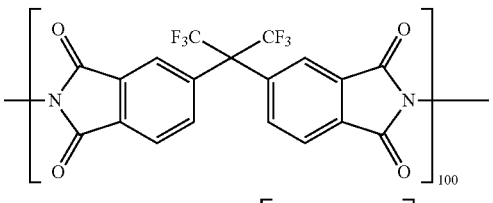
(P-1100)
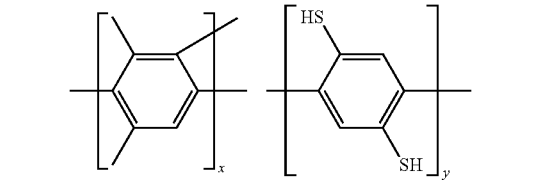
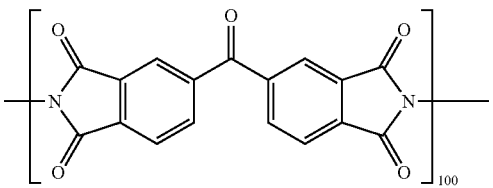
TABLE 1
| Polymer | Copolymerization ratio | | Weight average molecular weight |
|---|---|---|---|
| | x | y | |
| P-100 | 30.0000 | 70.0000 | 132000 |
| P-200 | 40.0000 | 60.0000 | 168000 |
| P-300 | 60.0000 | 40.0000 | 165000 |
| P-400 | 10.0000 | 90.0000 | 158000 |
| P-500 | 20.0000 | 80.0000 | 128000 |

TABLE 1-continued

| Polymer | Copolymerization ratio | | Weight average molecular weight |
| --- | --- | --- | --- |
| | x | y | |
| P-600 | 50.0000 | 50.0000 | 155000 |
| P-700 | 70.0000 | 30.0000 | 112500 |
| P-800 | 30.0000 | 70.0000 | 158000 |
| P-900 | 20.0000 | 80.0000 | 128000 |
| P-1000 | 60.0000 | 40.0000 | 150000 |
| P-1100 | 40.0000 | 60.0000 | 117000 |

Moreover, in the copolymerization ratio of the polyimide compound P-100 exemplified above, a polymer (P-101) in which x is set to 20.0000 and y is set to 80.0000 can be preferably used.

Further, in a case where the resin of the separation layer is polyimide, more specifically, MATRIMID 5218 that is put on the market under the trade mark of MATRIMID (registered trademark) registered by Huntsman Advanced Materials GmbH, and P84 and P84HT that are put on the market respectively under the trade names of P84 and P84HT registered by HP Polymers GmbH are preferable.

In addition, examples of the resin of the separation layer other than polyimide include celluloses such as cellulose acetate, cellulose triacetate, cellulose acetate butyrate, cellulose propionate, ethyl cellulose, methyl cellulose, and nitrocellulose; polydimethylsiloxanes; polyethylene glycols such as a polymer obtained by polymerizing polyethylene glycol #200 diacrylate (manufactured by Shin-Nakamura Chemical Co., Ltd.); and a polymer described in JP2010-513021A.

(Characteristics)

It is preferable that the film thickness of the separation layer is as small as possible under the conditions of imparting high gas permeability while maintaining the mechanical strength and gas separation selectivity.

From the viewpoint of improving the gas permeability, it is preferable that the separation layer of the gas separation membrane of the present invention is a thin layer. The thickness of the separation layer is typically 10 μm or less, preferably 5 μm or less, more preferably 3 μm or less, still more preferably 2 μm or less, even still more preferably 1 μm or less, and even still more preferably 0.5 μm or less.

Further, the thickness of the separation layer is typically 0.01 μm or greater and preferably 0.03 μm or greater from the practical viewpoint.

The following method is used as a method of measuring the film thickness of the separation layer.

After freezing and cutting the separation membrane, the membrane is coated with osmium (Os) and SEM-EDX observation is performed using SU8030 TYPE SEM (manufactured by Hitachi High-Technologies Corporation) (acceleration voltage of 5 kV).

In the obtained gas separation membrane, the variation coefficient of the thickness of the separation layer is preferably 1 or less, more preferably 0.5 or less, and still more preferably 0.3 or less. The variation coefficient of the thickness of the separation layer is a value calculated by randomly selecting 10 sites for measuring the film thickness, which are separated from each other by a distance of 1 cm or greater, in the separation layer constituting the gas separation membrane and performing measurement of the film thickness on these sites.

<Support>

Since the gas permeability can be sufficiently secured, it is preferable that the support used in the present invention is thin and is formed of a porous material.

The gas separation membrane of the present invention may be obtained by forming and arranging the separation layer on the surface of the porous support or may be a thin film composite conveniently obtained by forming the separation layer on the surface thereof. When the separation layer is formed on the surface of the porous support, a gas separation membrane with an advantage of having high separation selectivity, high gas permeability, and mechanical strength at the same time can be obtained.

In a case where the gas separation membrane of the present invention is a thin film composite, it is preferable that the thin film composite is formed by coating (the term "coating" in the present specification includes a form made by a coating material being adhered to a surface through immersion) the surface of the porous support with a coating solution (dope) that forms the above-described separation layer. Specifically, it is preferable that the support has a porous layer on the separation layer side and more preferable that the support is a laminate formed of non-woven fabric and a porous layer arranged on the separation layer side.

The material of the porous layer which is preferably applied to the support is not particularly limited and may be an organic or inorganic material as long as the material satisfies the purpose of providing mechanical strength and high gas permeability. A porous membrane of an organic polymer is preferable, and the thickness thereof is in a range of 1 μm to 3,000 μm, preferably in a range of 5 μm to 500 μm, and more preferably in a range of 5 μm to 150 μm. In regard to the pore structure of the porous layer, the average pore diameter is typically 10 μm or less, preferably 0.5 μm or less, and more preferably 0.2 μm or less. The porosity is preferably in a range of 20% to 90% and more preferably in a range of 30% to 80%. Further, the molecular weight cut-off of the porous layer is preferably 100,000 or less. Moreover, the gas permeability is preferably $3 \times 10^{-5}$ cm$^3$ (STP: STP is an abbreviation for standard temperature and pressure)/cm$^2$·cm·sec·cmHg (30 GPU: GPU is an abbreviation for gas permeation unit) or greater in terms of the permeation rate of carbon dioxide. Examples of the material of the porous layer include conventionally known polymers, for example, various resins such as a polyolefin resin such as polyethylene or polypropylene; a fluorine-containing resin such as polytetrafluoroethylene, polyvinyl fluoride, or polyvinylidene fluoride; polystyrene, cellulose acetate, polyurethane, polyacrylonitrile, polyphenylene oxide, polysulfone, polyether sulfone, polyimide, and polyaramid. As the shape of the porous layer, any of a flat shape, a spiral shape, a tabular shape, and a hallow fiber shape can be employed.

In the thin film composite, it is preferable that woven fabric, non-woven fabric, or a net used to provide mechanical strength is formed in the lower portion of the porous layer arranged on the separation layer side. In terms of film forming properties and the cost, non-woven fabric is preferably used. As the non-woven fabric, fibers formed of polyester, polypropylene, polyacrylonitrile, polyethylene, and polyamide may be used alone or in combination of plural kinds thereof. The non-woven fabric can be produced by papermaking main fibers and binder fibers which are uniformly dispersed in water using a circular net or a long net and then drying the fibers with a drier. Moreover, for the purpose of removing a nap or improving mechanical properties, it is preferable that thermal pressing processing is performed on the non-woven fabric by interposing the non-woven fabric between two rolls.

<Resin Layer>

In the case where the gas separation membrane of the present invention is a thin film composite, it is preferable that a resin layer is included between the separation layer and the support from the viewpoint of improving the adhesion.

The resin layer is a layer including a resin. It is preferable that the resin has a functional group which can be polymerized. Examples of such a functional group include an epoxy group, an oxetane group, a carboxyl group, an amino group, a hydroxyl group, and a thiol group. It is more preferable that the resin layer includes an epoxy group, an oxetane group, a carboxyl group, and a resin having two or more groups among these groups. It is preferable that such a resin is formed by being cured by irradiating a radiation-curable composition on a support with radiation.

The resin used for the resin layer may be polymerizable dialkylsiloxane formed from a partially cross-linked radiation-curable composition having a dialkylsiloxane group. Polymerizable dialkylsiloxane is a monomer having a dialkylsiloxane group, a polymerizable oligomer having a dialkylsiloxane group, or a polymer having a dialkylsiloxane group. The resin layer may be formed from a partially cross-linked radiation-curable composition having a dialkylsiloxane group. As the dialkylsiloxane group, a group represented by $-\{O-Si(CH_3)_2\}_n-$ (n represents a number of 1 to 100) can be exemplified. A poly(dialkylsiloxane) compound having a vinyl group at the terminal can be preferably used.

It is preferable that the material of the resin layer is at least one selected from polydimethylsiloxane (hereinafter, also referred to as PDMS), poly(l-trimethylsilyl-1-propyne) (hereinafter, also referred to as PTMSP), and polyethylene oxide, more preferable that the material thereof is polydimethylsiloxane or poly(l-trimethylsilyl-1-propyne), and particularly preferable that the material thereof is polydimethylsiloxane.

Commercially available materials can be used as the material of the resin layer and preferred examples of the resin of the resin layer include UV9300 (polydimethylsiloxane (PDMS), manufactured by Momentive Performance Materials Inc.) and X-22-162C (manufactured by Shin-Etsu Chemical Co., Ltd.).

UV9380C (bis(4-dodecylphenyl)iodonium hexafluoroantimonate, manufactured by Momentive Performance Materials Inc.) can be preferably used as other materials of the resin layer.

In the present invention, it is preferable that the resin layer includes inorganic particles and more preferable that the resin layer contains a resin and inorganic particles having an average particle diameter of 10 nm or greater which is less than 0.34 times the film thickness of the resin layer and the content of the inorganic particles contained in the resin layer is 40% by mass or less with respect to the content of the resin contained in the resin layer.

The preferable range of the addition amount of the above-described inorganic particles contained in the resin layer with respect to the amount of the resin contained in the resin layer is the same as the preferable range of the addition amount of the above-described inorganic particles contained in the protective layer with respect to the amount of the resin contained in the protective layer.

The preferable ranges of the average particle diameter, the type, and the pore size of the above-described inorganic particles contained in the resin layer are the same as the preferable ranges of the average particle diameter, the type, and the pore size of the above-described inorganic particles contained in the protective layer.

The relationship between the average particle diameter of the above-described inorganic particles contained in the resin layer and the film thickness of the separation layer is not particularly limited, but the average particle diameter of the above-described inorganic particles contained in the resin layer is in a range of 0.001 times to 0.34 times the film thickness of the resin layer, more preferably in a range of 0.01 times to 0.34 times the film thickness of the resin layer, and particularly preferably in a range of 0.01 times to 0.30 times the film thickness of the resin layer.

The material of the resin layer can be prepared as a composition including an organic solvent when the resin layer is formed, and it is preferable that the material thereof is a curable composition.

The organic solvent which can be used when the resin layer including the above-described silicone compound is formed is not particularly limited, and examples thereof include n-heptane.

The film thickness of the resin layer is not particularly limited, but the film thickness thereof is preferably in a range of 20 nm to 1000 nm, more preferably in a range of 20 nm to 900 nm, and particularly preferably in a range of 30 nm to 800 nm. The film thickness of the resin layer can be acquired by SEM.

The film thickness of the resin layer can be controlled by adjusting the coating amount of the curable composition.

<Characteristics and Applications>

The gas separation membrane of the present invention can be suitably used according to a gas separation recovery method and a gas separation purification method. For example, a gas separation membrane which is capable of efficiently separating specific gas from a gas mixture containing gas, for example, hydrogen, helium, carbon monoxide, carbon dioxide, hydrogen sulfide, oxygen, nitrogen, ammonia, a sulfur oxide, or a nitrogen oxide; hydrocarbon such as methane, or ethane; unsaturated hydrocarbon such as propylene; or a perfluoro compound such as tetrafluoroethane can be obtained.

It is preferable that the gas separation membrane of the present invention is used to separate at least one kind of acidic gas from a gas mixture of acidic gas and non-acidic gas. Examples of the acidic gas include carbon dioxide, hydrogen sulfide, carbonyl sulfide, a sulfur oxide (SOx), and a nitrogen oxide (NOx). Among these, at least one selected from carbon dioxide, hydrogen sulfide, carbonyl sulfide, a sulfur oxide (SOx), and a nitrogen oxide (NOx) is preferable; carbon dioxide, hydrogen sulfide, or a sulfur oxide (SOx) is more preferable; and carbon dioxide is particularly preferable.

As the non-acidic gas, at least one selected from hydrogen, methane, nitrogen, and carbon monoxide is preferable; methane or hydrogen is more preferable, and methane is particularly preferable.

It is preferable that the gas separation membrane of the present invention selectively separates carbon dioxide from the gas mixture including particularly carbon dioxide and hydrocarbon (methane).

In addition, in a case where gas subjected to a separation treatment is mixed gas of carbon dioxide and methane, the permeation rate of the carbon dioxide at 40° C. and 5 MPa is preferably greater than 100 GPU, more preferably in a range of 150 GPU, particularly preferably greater than 300 GPU, more particularly greater than 600 GPU, and still more particularly preferably greater than 800 GPU.

Further, 1 GPU is $1\times10^{-6}$ cm$^3$(STP)/cm$^2$·sec·cmHg.

In the case where the gas separation membrane of the present invention is a membrane in which the gas subjected to a separation treatment is mixed gas of carbon dioxide and methane, a gas separation selectivity a which is a ratio of the permeation flux of carbon dioxide at 40° C. and 5 MPa to the permeation flux of methane is preferably 20 or greater, more preferably 25 or greater, particularly preferably 30 or greater, and more particularly preferably 33 or greater.

It is considered that a mechanism of dissolution and diffusion in a membrane is involved in the selective gas permeation. From this viewpoint, a separation membrane including a polyethyleneoxy (PEO) composition is examined (see Journal of Membrane Science, 160 (1999), pp. 87 to 99). This is because interaction between carbon dioxide and the polyethyleneoxy composition is strong. Since this polyethyleneoxy film is a flexible rubber-like polymer film having a low glass transition temperature, a difference in the diffusion coefficient resulting from the kind of gas is small and the separation selectivity is mainly due to the effect of a difference in solubility. Meanwhile, the preferred embodiments of the present invention can be significantly improved from the viewpoints of the high glass transition temperature of the polyimide resin applied to the embodiments and the thermal durability of the membrane while the above-described action of dissolution and diffusion is exhibited.

<Method of Producing Gas Separation Membrane>

A method of producing the gas separation membrane is not particularly limited.

<Formation of Resin Layer>

It is preferable that the method of producing the gas separation membrane includes a process of forming a resin layer on a support.

The method of forming a resin layer on the support is not particularly limited, but it is preferable to coat the surface with a composition including a material of the resin layer and an organic solvent. The coating method is not particularly limited and a known method can be used. For example, the coating can be appropriately performed according to a spin coating method, a dip coating method, or a bar coating method.

It is preferable that the composition including a material of the resin layer and an inorganic solvent is a curable composition. The method of irradiating a curable composition with radiation when the resin layer is formed is not particularly limited. Since electron beams, ultraviolet (UV) rays, visible light, or infrared rays can be used for irradiation, the method can be appropriately selected according to the material to be used.

The time for irradiation with radiation is preferably in a range of 1 second to 30 seconds.

The radiant energy is preferably in a range of 10 mW/cm$^2$ to 500 mW/cm$^2$.

After the resin layer is formed on the support, it is preferable that a specific treatment is performed on the resin layer before the separation layer is formed. As the specific treatment performed on the resin layer, an oxygen atom infiltration process of infiltrating oxygen atoms into the resin layer is preferable and a plasma treatment is more preferable.

From the viewpoints that the separation selectivity is improved, the scratch resistance is increased, and the separation selectivity is unlikely to be degraded, it is more preferable that the plasma treatment is carried out for 5 seconds or longer under the above-described conditions. In addition, it is preferable that the plasma treatment is carried out for 1000 seconds or less under the above-described conditions.

Moreover, the integrated amount of energy resulting from the plasma treatment is preferably in a range of 25 J to 500000 J.

The plasma treatment may be carried out according to a usual method. An embodiment in which a workpiece is treated in a large vacuum chamber using a reduced-pressure plasma in order to generate a stabilized plasma is exemplified as the conventional method. Recently, an atmospheric pressure plasma treatment apparatus which is capable of performing a treatment in an atmospheric pressure atmosphere has been developed. Using the atmospheric pressure plasma treatment apparatus, gas mainly formed of argon gas is introduced into a process chamber and a high-density plasma can be stably generated in an atmospheric pressure atmosphere. As an example of the system configuration of the atmospheric pressure plasma treatment apparatus, a configuration formed of a gas mixing and controlling unit, a reactor, and a conveying conveyor (alternatively, an XY table) is exemplified. A configuration in which a treatment is carried out by blowing a plasma jet from a circular nozzle in a spot form has been suggested.

In regard to the plasma treatment conditions, the flow rate of argon is preferably in a range of 5 cm$^3$(STP)/min to 500 cm$^3$(STP)/min, more preferably in a range of 50 cm$^3$(STP)/min to 200 cm$^3$(STP)/min, and particularly preferably in a range of 80 cm$^3$(STP)/min to 120 cm$^3$(STP)/min. The flow rate of oxygen is preferably in a range of 1 cm$^3$(STP)/min to 100 cm$^3$(STP)/min and more preferably in a range of 5 cm$^3$(STP)/min to 100 cm$^3$(STP)/min.

In regard to the plasma treatment conditions, the vacuum degree is preferably in a range of 0.6 Pa to 15 Pa.

In regard to the plasma treatment conditions, the discharge power is in a range of 5 W to 200 W.

<Method of Separating Separation Layer>

The method of preparing the separation layer is not particularly limited, and the separation layer may be formed by obtaining a commercially available product of a known material, may be formed according to a known method, or may be formed according to a method described below using a specific resin.

The method of forming the separation layer is not particularly limited, but it is preferable that a lower layer (for example, a support layer or a resin layer) is coated with a composition including a material of the separation layer and an organic solution. The coating method is not particularly limited and the coating can be performed according to a known method, for example, a spin coating method.

The conditions for forming the separation layer of the gas separation membrane of the present invention are not particularly limited, but the temperature thereof is preferably in a range of –30° C. to 100° C., more preferably in a range of –10° C. to 80° C., and particularly preferably in a range of 5° C. to 50° C.

<Formation of Protective Layer>

The method of forming a protective layer on the surface of the separation layer subjected to the surface treatment is not particularly limited, but it is preferable to coat the surface with a composition including a material of the protective layer and an organic solvent. Examples of the organic solvent include organic solvents used to form the separation layer. The coating method is not particularly limited and a known method can be used. For example, the coating can be performed according to a spin coating method.

The method of irradiating a curable composition with radiation when the protective layer is formed is not particularly limited. Since electron beams, ultraviolet (UV) rays, visible light, or infrared rays can be used for irradiation, the method can be appropriately selected according to the material to be used.

The time for irradiation with radiation is preferably in a range of 1 second to 30 seconds.

The radiant energy is preferably 10 mW/cm$^2$ to 500 mW/cm$^2$.

<Method of Separating Gas Mixture>

Using the gas separation membrane of the present invention, it is possible to perform separation of a gas mixture.

In the method of separating a gas mixture used for the gas separation membrane of the present invention, the components of the gas mixture of raw materials are affected by the production area of the raw materials, the applications, or the use environment and are not particularly defined, but it is preferable that the main components of the gas mixture are carbon dioxide and methane, carbon dioxide and nitrogen, or carbon dioxide and hydrogen. That is, the proportion of carbon dioxide and methane or carbon dioxide and hydrogen in the gas mixture is preferably in a range of 5% to 50% and more preferably in a range of 10% to 40% in terms of the proportion of carbon dioxide. In a case where the gas mixture is present in the coexistence of an acidic gas such as carbon dioxide or hydrogen sulfide, the method of separating the gas mixture using the gas separation membrane of the present invention exhibits particularly excellent performance. Preferably, the method thereof exhibits excellent performance at the time of separating carbon dioxide and hydrocarbon such as methane, carbon dioxide and nitrogen, or carbon dioxide and hydrogen.

It is preferable that the method of separating a gas mixture includes a process of allowing carbon dioxide to selectively permeate from mixed gas including carbon dioxide and methane. The pressure during gas separation is preferably in a range of 1 MPa to 10 MPa and more preferably in a range of 2 MPa to 7 MPa. Further, the temperature during gas separation is preferably in a range of −30° C. to 90° C. and more preferably in a range of 15° C. to 70° C.

[Gas Separation Membrane Module]

A gas separation membrane module of the present invention includes the gas separation membrane of the present invention.

It is preferable that the gas separation membrane of the present invention is used for a thin film composite obtained by combining with a porous support and also preferable that the gas separation membrane is used for a gas separation membrane module using this thin film composite. Further, using the gas separation membrane, the thin film composite, or the gas separation membrane module of the present invention, a gas separation device having means for performing separation and recovery of gas or performing separation and purification of gas can be obtained. The gas separation membrane of the present invention can be made into a module and preferably used. Examples of the module include a spiral type module, a hollow fiber type module, a pleated module, a tubular module, and a plate & frame type module. Among these, a spiral type module (a spiral-wound type or an SW type module) is preferable. The gas separation membrane of the present invention may be applied to a gas separation and recovery apparatus which is used together with an absorption liquid described in JP2007-297605A according to a membrane/absorption hybrid method.

EXAMPLES

The characteristics of the present invention will be described in detail with reference to examples and comparative examples described below. The materials, the amounts to be used, the ratios, the treatment contents, and the treatment procedures shown in the examples described below can be appropriately changed as long as it is within the gist of the present invention. Accordingly, the scope of the present invention should not be limitatively interpreted by the specific examples described below.

Moreover, "part" and "%" in the sentences are on a mass basis unless otherwise noted.

Example 1

<Preparation of SAPO-34 Particles (Silicoaluminophosphate Zeolite Particles)>

1.0 equivalent of aluminum isopropoxide (manufactured by Wako Pure Chemical Industries, Ltd.), 0.3 equivalent of tetraethylammonium hydroxide (TEAOH, 35% by mass, manufactured by Aldrich Corporation), and pure water were sufficiently stirred and mixed with each other at room temperature. Thereafter, 0.3 equivalent of $SiO_2$ (colloidal silica Ludox SM, manufactured by Aldrich Corporation) was added thereto and the solution was stirred for 2 hours. Finally, 2 equivalent of phosphoric acid (manufactured by Wako Pure Chemical Industries, Ltd.) was slowly added drop by drop and the solution was stirred for 1 hour. The equivalent of the pure water was set to be in a range of 30 to 120. The solution was transferred to an autoclave tube and then was subjected to a treatment in a microwave oven at 180° C. for 1 hour. Synthesized particles were centrifuged and washed with ethanol and water respectively three times. The resultant was dried and baked at 550° C. for 6 hours. SAPO-34 particles having particle diameters different from each other were able to be obtained by adjusting the amount of pure water. Therefore, SAPO-34 particles having an average particle diameter of 0.15 μm were obtained in Example 1.

The average particle diameter of inorganic particles such as SAPO-34 particles is a value in which the average diameter of inorganic particles measured by the following method was acquired as an average of 50 inorganic particles. In addition, the "particle diameter" in the following table means the average particle diameter.

The particles suitably diluted with a solvent were added dropwise to grids for a transmission electron microscope, dried, and observed by the transmission electron microscope.

<Surface Modification of SAPO-34 Particles>

0.2 mL of 3-aminopropyltrimethoxysilane (manufactured by Tokyo Chemical Industry Co., Ltd.) was mixed with a solution obtained by mixing ethanol (manufactured by Merch KGaA), water, and HCl at a mixing ratio of 19:80:0.02, and the solution was stirred at room temperature for 15 minutes. Subsequently, SAPO-34 particles obtained in the above-described manner were added thereto, and the solution was stirred at 50° C. for 40 minutes. The solution was allowed to stand for 24 hours, the volatile solvent was evaporated, and then pure water was evaporated in an oven, thereby obtaining SAPO-34 particles subjected to surface modification.

<Preparation of Resin Layer>

(Preparation of Radiation-Curable Polymer Having Dialkylsiloxane Group)

An n-heptane solution including 39.087% by mass of commercially available UV9300 (polydimethylsiloxane (PDMS) having the following structure, manufactured by Momentive Performance Materials Inc., oxirane having an epoxy equivalent of 950 g/mol, weight average molecular weight according to viscometry: 9,000), 10.789% by mass of commercially available X-22-162C (both-terminal carboxyl-modified silicone having the following structure, manufactured by Shin-Etsu Chemical Co., Ltd., weight average molecular weight: 4,600), and 0.007% by mass of DBU (1,8-diazabicyclo[5.4.0]undec-7-ene) was prepared, and 168 hours passed while the solution was maintained at 95° C., thereby obtaining a radiation-curable polymer solution (viscosity of 22.8 mPa·s at 25° C.) having a poly(siloxane) group.

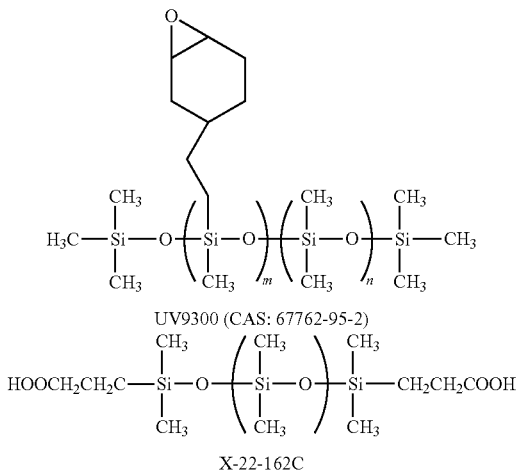

(Preparation of Polymerizable Radiation-Curable Composition)

The radiation-curable polymer solution was cooled to 20° C., and n-heptane was added thereto to dilute the solution until the concentration thereof became 5% by mass. A radiation-curable composition was prepared by filtering the obtained solution using filter paper having a filtration accuracy of 2.7 μm. 0.1% by mass of UV9380C (45% by mass of bis(4-dodecylphenyl)iodonium hexafluoroantimonate, manufactured by Momentive Performance Materials Inc., alkyl glycidyl ether solution) serving as a photopolymerization initiator and 0.1% by mass of Ti(OiPr)$_4$ (titanium (IV) isopropoxide manufactured by Dorf Ketal Chemicals) were added to the radiation-curable composition, and 5% by mass of the SAPO-34 particles subjected to surface modification was added thereto, thereby preparing a polymerizable radiation-curable composition.

(Coating Porous Support with Polymerizable Radiation-Curable Composition and Formation of Resin Layer)

A polyacrylonitrile (PAN) porous membrane (the polyacrylonitrile porous membrane was present on non-woven fabric, the thickness of the film including the non-woven fabric was approximately 180 μm) was used as a support, and the support was coated with the polymerizable radiation-curable composition, subjected to a UV treatment (LIGHT HAMMER 10, manufactured by Fusion UV System Corporation, D-VALVE) under the conditions of a UV intensity of 24 kW/m for a treatment time of 10 seconds, and then dried. In this manner, a resin layer including SAPO-34 particles and a polysiloxane resin and having a thickness of 600 nm was formed on the porous support.

<Preparation of Separation Layer>

(Synthesis of Polymer (P-101))

A polymer (P-101) was synthesized by the following reaction scheme.

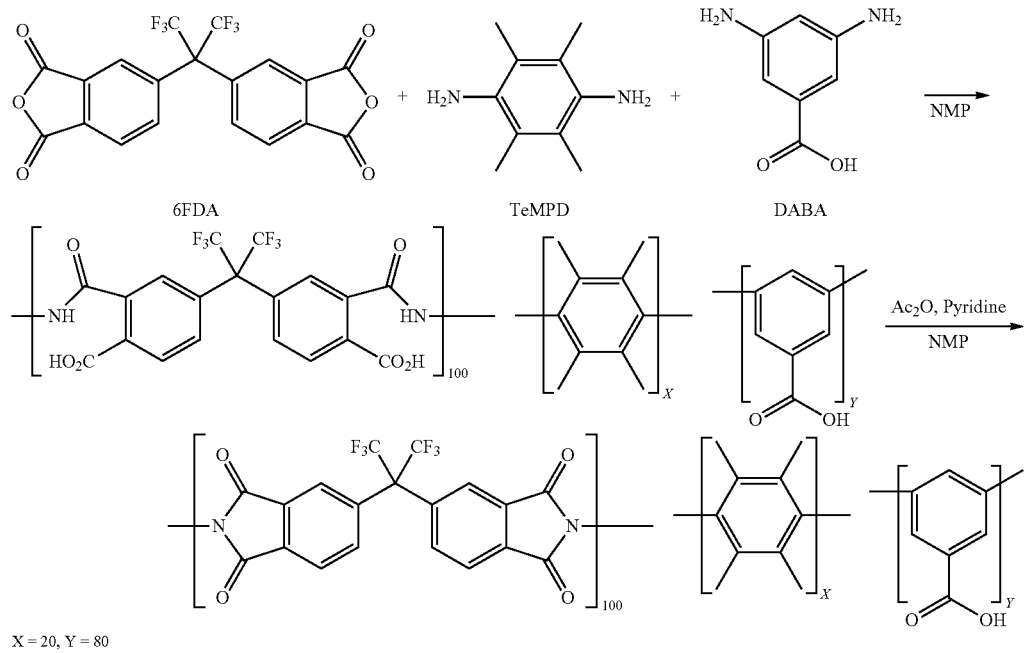

123 ml of N-methylpyrrolidone and 54.97 g (0.124 mol) of 6FDA (manufactured by product number: H0771) were added to a 1 L three-necked flask, dissolved at 40° C., and stirred in a nitrogen stream. A solution obtained by dissolving 4.098 g (0.0248 mol) of 2,3,5,6-tetramethylphenylenediamine (manufactured by Tokyo Chemical Industry Co., Ltd., product number: T1457) and 15.138 g (0.0992 mol) of 3,5-diaminobenzoic acid in 84.0 ml of N-methylpyrrolidone was added dropwise to the above-described solution for 30 minutes while the temperature in the system was maintained at 40° C. After the reaction solution was stirred at 40° C. for 2.5 hours, 2.94 g (0.037 mol) of pyridine (manufactured by Wako Pure Chemical Industries, Ltd.) and 31.58 g (0.31 mol) of acetic anhydride (manufactured by Wako Pure Chemical Industries, Ltd.) were respectively added to the reaction solution, and the solution was further stirred at 80° C. for 3 hours. Subsequently, 676.6 mL of acetone was added to the reaction solution so that the solution was diluted. An acetone diluent of the reaction solution was added dropwise to a solution obtained by adding 1.15 L of methanol and 230 mL of acetone to a 5 L stainless steel container and stirring the mixture. The obtained polymer crystals were suctioned and filtered and then air-dried at 60° C., thereby obtaining 50.5 g of a polymer (P-101). Further, the polymer (P-101) was a polymer in which x was set to 20 and y was set to 80 in the polyimide compound P-100 exemplified above. In the following Tables 2 to 6, the polymer (P-101) was abbreviated as PI.

(Formation of Separation Layer)

A plasma treatment was performed on a resin layer for 5 seconds under the conditions of a plasma treatment at a flow rate of oxygen of 50 cm$^3$(STP)/min, a flow rate of argon of 100 cm$^3$(STP)/min, and a discharge power of 10 W.

1.4 g of the polymer (P-101) having a reactive group, 8.6 g of methyl ethyl ketone, and 0.14 g of the SAPO-34 particles subjected to the surface modification which were obtained in the above-described method were mixed with each other in a 30 ml brown vial bottle and stirred at 25° C. for 30 minutes.

Next, the plasma-treated surface of the resin layer was coated with the stirred solution for forming a separation layer so that a separation layer having a thickness of 1000 nm was formed. The obtained separation layer was a layer in which a ratio (PCO$_2$/PCH$_4$) of a permeability coefficient (PCO$_2$) of carbon dioxide to a permeability coefficient (PCH$_4$) of methane was 1.5 or greater when pure gas of carbon dioxide (CO$_2$) and methane (CH$_4$) was supplied by forming a membrane having a thickness of 1 μm to 30 μm and setting the temperature thereof to 40° C. and the total pressure on the gas supply side to 0.5 MPa with respect to the obtained membrane.

<Formation of Protective Layer>

Next, after the separation layer was coated with a polymerizable radiation-curable composition used to form a resin layer, a protective layer having a thickness of 600 nm was formed on the separation layer by performing a UV treatment under the UV treatment conditions similar to those for formation of a resin layer, and then the formed layer was dried at 50° C.

The obtained gas separation membrane was set as a gas separation membrane of Example 1. The layer configuration of Example 1 is listed in Table 2 and the abbreviation PDMS of a resin used for the protective layer stands for polydimethylsiloxane. The same applies to the abbreviation PDMS of Tables 3 to 6.

Examples 2 to 10 and Comparative Example 9

Gas separation membrane of Examples 2 to 10 and Comparative Example 9 were obtained in the same manner as in Example 1 except that the addition amounts of inorganic particles contained in the polymerizable radiation-curable composition used to form a resin layer and a protective layer and contained in the solution for forming a separation layer in Example 1 were changed so that the addition amounts of the inorganic particles contained in the resin layer, the separation layer, and the protective layer were changed as listed in the following Table 2.

Comparative Examples 1 to 4

Gas separation membranes of Comparative Examples 1 to 4 were obtained in the same manner as those in Examples 1 to 4 except that a protective layer was not forming in Examples 1 to 4.

Comparative Examples 5 to 8

Gas separation membranes of Comparative Examples 5 to 8 were obtained in the same manner as those in Examples 1 to 4 except that inorganic particles were not added to the polymerizable radiation-curable composition used to form a protective layer in Examples 1 to 4.

Examples 11 and 12 and Comparative Example 10

At the time of preparation of the SAPO-34 particles of Example 1, the amount of pure water was adjusted and SAPO-34 particles having average particle diameters of 120 nm, 200 nm, and 300 nm were prepared.

Subsequently, gas separation membranes of Examples 11 and 12 and Comparative Example 10 were obtained in the same manner as that in Example 3 except that the average particle diameter of the inorganic particles to be added to the polymerizable radiation-curable composition used to form a resin layer and a protective layer in Example 3 was changed as listed in the following Table 3.

Further, in Examples 11 and 12 and Comparative Example 10, the average particle diameter of the SAPO-34 particles used for a separation layer was 150 nm similar to that of Example 3 and the film thickness of the separation layer was 1000 nm similar to that of Example 3.

Examples 13 and 14

At the time of preparation of the SAPO-34 particles of Example 1, the amount of pure water was adjusted and SAPO-34 particles having average particle diameters of 250 nm and 375 nm were prepared.

Subsequently, gas separation membranes of Examples 13 and 14 were obtained in the same manner as that in Example 3 except that the average particle diameter of the inorganic particles to be added to the polymerizable radiation-curable composition used to form a resin layer and a protective layer in Example 3 was changed as listed in the following Table 4 and the thicknesses of the resin layer and the protective layer were respectively changed to 1000 nm and 1500 nm.

Further, in Examples 13 and 14, the average particle diameter of SAPO-34 particles used for a separation layer was 150 nm similar to that of Example 3 and the film thickness of the separation layer was 1000 nm similar to that of Example 3.

Example 15

As inorganic particles, zeolite SSZ-13 were synthesized by referring to U.S. Pat. No. 4,544,538A and the average particle diameter thereof was adjusted to 300 nm according to the following method.

After synthesis, the resultant was pulverized using a ball mill.

A gas separation membrane of Example 15 was obtained in the same manner as in Example 3 except that the type of inorganic particles added to the polymerizable radiation-curable composition used to form a resin layer and a protective layer in Examples was changed to the above-described zeolite SSZ-13.

Further, the film thicknesses of the resin layer and the protective layer of the gas separation membrane of Example 15 were the same as those in Example 3.

Example 16

A gas separation membrane of Example 16 was obtained in the same manner as in Example 3 except that CARBOSIEVE-SIII (manufactured by Aldrich Corporation) serving as a carbon molecular sieve (noted as CMS in the following table) was pulverized using a ball mill and the average particle diameter thereof was set to 300 nm so as to be used as the inorganic particles added to the polymerizable radiation-curable composition used to form a resin layer and a protective layer in Example 3.

Further, the film thicknesses of the resin layer and the protective layer of the gas separation membrane of Example 16 were the same as those in Example 3.

Example 17

A gas separation membrane of Example 17 was obtained in the same manner as in Example 3 except that CABOSIL TS530 (manufactured by Cabot Corporation) serving as silica particles (described as Silica in the following tables) having an average particle dimeter of 13 nm was used as the inorganic particles added to the polymerizable radiation-curable composition used to form a resin layer and a protective layer in Example 3.

Further, the film thicknesses of the resin layer and the protective layer of the gas separation membrane of Example 17 were the same as those in Example 3.

Example 18

A gas separation membrane of Example 18 was obtained in the same manner as in Example 3 except that zeolite SSZ-13 prepared in Example 15 was used as the inorganic particles contained in the solution used to form a separation layer in Example 3.

Further, the film thicknesses of the resin layer and the protective layer of the gas separation membrane of Example 18 were the same as those in Example 3.

Comparative Example 11

A gas separation membrane of Comparative Example 11 was obtained in the same manner as in Example 18 except that a protective layer was not formed in Example 18.

Comparative Example 12

A gas separation membrane of Comparative Example 12 was obtained in the same manner as in Example 18 except that the inorganic particles were not added to the polymerizable radiation-curable composition used to form a protective layer in Example 18.

Example 19

A gas separation membrane of Example 19 was obtained in the same manner as in Example 3 except that the support was directly coated with the solution used to form a separation layer without faulting a resin layer on the support in Example 3.

The state of adhesion of the separation layer to the support was poor and performance evaluation was performed using a portion in which a membrane was visually in an excellent state.

Example 20

A gas separation membrane of Example 20 was obtained in the same manner as in Example 3 except that the inorganic particles were not added to the polymerizable radiation-curable composition used to form a resin layer in Example 3.

Example 21

A gas separation membrane of Example 21 was obtained in the same manner as in Example 3 except that the inorganic particle contained in the polymerizable radiation-curable composition used to form a resin layer were changed to SAPO-34 particles having an average particle diameter of 120 nm in Example 3. Further, the film thickness of the resin layer of the gas separation membrane of Example 21 was the same as that in Example 3.

<Evaluation of Gas Permeability and Separation Selectivity>

The gas separation membranes, which were the obtained thin film composites, of the respective examples and the comparative examples were evaluated using a SUS316 STAINLESS STEEL CELL (manufactured by DENISSEN Ltd.) having high pressure resistance. The respective gas permeabilities of $CO_2$ and $CH_4$ at 40° C. were measured by TCD detection type gas chromatography by adjusting the total pressure on the gas supply side of mixed gas, in which the volume ratio of carbon dioxide ($CO_2$) to methane ($CH_4$) was set to 10:90, to 5 MPa (partial pressure of $CO_2$: 0.5 MPa). The gas separation selectivity of a gas separation membrane of each example and each comparative example was calculated as a ratio ($P_{CO2}/P_{CH4}$) of the permeability coefficient $P_{CO2}$ of $CO_2$ to the permeability coefficient $P_{CH4}$ of $CH_4$ of this membrane. The $CO_2$ permeability of a gas separation membrane of each example and each comparative example was set as the permeability $Q_{CO2}$ (unit: GPU) of $CO_2$ of this membrane.

In addition, the unit of gas permeability was expressed by the unit of GPU [1 GPU=1×10$^{-6}$ cm$^3$ (STP)/cm$^2$·sec·cmHg] representing the permeation flux (also referred to as permeation rate, permeability, and Permeance) per pressure difference or the unit of barrer [1 barrer=1×10$^{-10}$ cm$^3$ (STP)·cm/cm$^2$·sec·cmHg] representing the permeation coefficient. In the present specification, the symbol Q is used to represent in a case of the unit of GPU and the symbol P is used to represent in a case of the unit of barrer.

Moreover, both of the gas permeability (GPU value) and the separation selectivity of the gas separation membranes of respective examples and respective comparative examples were values obtained by performing measurement on flat membranes before the membranes were made into spiral type gas separation membrane modules.

<Evaluation of Spiral Type>

Spiral type (specifically, spiral-wound type) gas separation membrane modules (SW modules) were respectively prepared using the gas separation membranes of respective examples and respective comparative examples according to the following method.

A prepared gas separation membrane was folded into two so that the gas separation membrane was inside. Kapton tape was put on the valley portion folded into two and thus the surface of the valley portion of the membrane was reinforced. In addition, FEED SPACER (manufactured by Delstar Co., Ltd., one side (aperture) of square of opening portion: 1.5 mm, thickness: 500 μm) serving as a member for a supply gas channel was interposed between the separation membranes folded into two, thereby preparing a leaf.

The prepared leaf on a porous support side was coated with an adhesive (E120HP, manufactured by Henkel Japan Ltd.) to have an envelope shape, a member for a permeating gas channel made of tricot knitting epoxy-impregnated polyester was laminated thereon and wound around an effective hallow central tube (permeating gas collecting tube) multiple times, and a tension was applied thereto, thereby preparing an SW module.

SW modules obtained in the above-described manner were used as gas separation membrane modules of respective examples and respective comparative examples.

Thereafter, each prepared gas separation membrane module 10 was accommodated in a cylindrical sealed container in a state in which only an open end 12b of a central tube 12 was outside, helium gas was introduced into the sealed container, and the flow rate of the helium gas discharged from the open end 12b of the central tube 12 was measured in a state in which a pressure of 0.3 MPa was applied thereto.

Next, the pressure was raised to 1.5 MPa and the flow rate of the helium gas discharged from the open end 12b of the central tube 12 was measured in the same manner.

Further, the sealed container was heated to 100° C. while the pressure was maintained to 1.5 MPa and the flow rate of the helium gas discharged from the open end 12b of the central tube 12 was measured in the same manner.

A case where the flow rate of the helium gas discharged from the open end 12b of the central tube 12 was less than 100 mL/min was evaluated as A; a case where the flow rate of the helium gas discharged from the open end 12b of the central tube 12 was 100 mL/min to less than 200 mL/min was evaluated as B; and a case where the flow rate of the helium gas discharged from the open end 12b of the central tube 12 was 200 mL/min or greater was evaluated as C. In the spiral type evaluation, a module evaluated as A or B is preferable and a module evaluated as A is particularly preferable. In addition, the gas permeability (GPU value) and the separation selectivity of a gas separation membrane module, evaluated as C in the spiral type evaluation, after being made into a spiral type module were hardly measured.

The results of the above-described evaluation are listed in the following Tables 2 to 6.

TABLE 2

| | Resin layer Inorganic particles | Separation layer | | | Protective layer | | | | |
|---|---|---|---|---|---|---|---|---|---|
| | | | Inorganic particles | | | Inorganic particles | | | |
| | Particle diameter/film thickness of resin layer | Resin Type | Type | Addition amount [% by mass] | Resin Type | Type | Addition amount [% by mass] | Particle diameter [nm] | Particle diameter/film thickness of protective layer |
| Example 1 | 0.25 | PI | SAPO34 | 5 | PDMS | SAPO34 | 10 | 150 | 0.25 |
| Example 2 | 0.25 | PI | SAPO34 | 10 | PDMS | SAPO34 | 10 | 150 | 0.25 |
| Example 3 | 0.25 | PI | SAPO34 | 20 | PDMS | SAPO34 | 10 | 150 | 0.25 |
| Example 4 | 0.25 | PI | SAPO34 | 30 | PDMS | SAPO34 | 10 | 150 | 0.25 |
| Example 5 | 0.25 | PI | SAPO34 | 40 | PDMS | SAPO34 | 10 | 150 | 0.25 |
| Example 6 | 0.25 | PI | SAPO34 | 20 | PDMS | SAPO34 | 1 | 150 | 0.25 |
| Example 7 | 0.25 | PI | SAPO34 | 20 | PDMS | SAPO34 | 5 | 150 | 0.25 |
| Example 8 | 0.25 | PI | SAPO34 | 20 | PDMS | SAPO34 | 20 | 150 | 0.25 |
| Example 9 | 0.25 | PI | SAPO34 | 20 | PDMS | SAPO34 | 40 | 150 | 0.25 |
| Comparative Example 1 | — | PI | SAPO34 | 5 | None | — | — | — | — |
| Comparative Example 2 | — | PI | SAPO34 | 10 | None | — | — | — | — |
| Comparative Example 3 | — | PI | SAPO34 | 20 | None | — | — | — | — |
| Comparative Example 4 | — | PI | SAPO34 | 30 | None | — | — | — | — |
| Comparative Example 5 | — | PI | SAPO34 | 5 | PDMS | — | — | — | — |
| Comparative Example 6 | — | PI | SAPO34 | 10 | PDMS | — | — | — | — |
| Comparative Example 7 | — | PI | SAPO34 | 20 | PDMS | — | — | — | — |
| Comparative Example 8 | — | PI | SAPO34 | 30 | PDMS | — | — | — | — |
| Example 10 | 0.25 | PI | SAPO34 | 20 | PDMS | SAPO34 | 0.5 | 150 | 0.25 |
| Comparative Example 9 | 0.25 | PI | SAPO34 | 20 | PDMS | SAPO34 | 50 | 150 | 0.25 |

| | Protective layer | Evaluation | | |
|---|---|---|---|---|
| | Film thickness [nm] | $CO_2$ permeability $Q_{CO2}$ [GPU] | Separation selectivity | Spiral type |
| Example 1 | 600 | 165 | 32 | A |
| Example 2 | 600 | 682 | 31 | A |
| Example 3 | 600 | 986 | 34 | A |
| Example 4 | 600 | 962 | 35 | A |

TABLE 2-continued

|  |  |  |  |  |
|---|---|---|---|---|
| Example 5 | 600 | 946 | 33 | A |
| Example 6 | 600 | 570 | 33 | A |
| Example 7 | 600 | 896 | 34 | A |
| Example 8 | 600 | 969 | 34 | A |
| Example 9 | 600 | 901 | 35 | A |
| Comparative Example 1 | — | 162 | 28 | B |
| Comparative Example 2 | — | 682 | 26 | C |
| Comparative Example 3 | — | 935 | 12 | C |
| Comparative Example 4 | — | 965 | 6 | C |
| Comparative Example 5 | 600 | 81 | 29 | A |
| Comparative Example 6 | 600 | 386 | 26 | B |
| Comparative Example 7 | 600 | 532 | 26 | C |
| Comparative Example 8 | 600 | 586 | 28 | C |
| Example 10 | 600 | 530 | 25 | A |
| Comparative Example 9 | 600 | 1035 | 12 | C |

TABLE 3

|  | Resin layer Inorganic particles | Separation layer | | | Protective layer | | | | |
|---|---|---|---|---|---|---|---|---|---|
|  |  |  | Inorganic particles | | | Inorganic particles | | | |
|  | Particle diameter/film thickness of resin layer | Resin Type | Type | Addition amount [% by mass] | Resin Type | Type | Addition amount [% by mass] | Particle diameter [nm] | Particle diameter/film thickness of protective layer |
| Example 11 | 0.33 | PI | SAPO34 | 20 | PDMS | SAPO34 | 10 | 200 | 0.33 |
| Example 12 | 0.20 | PI | SAPO34 | 20 | PDMS | SAPO34 | 10 | 120 | 0.2 |
| Comparative Example 10 | 0.50 | PI | SAPO34 | 20 | PDMS | SAPO34 | 10 | 300 | 0.5 |

|  | Protective layer | Evaluation | | |
|---|---|---|---|---|
|  | Film thickness [nm] | $CO_2$ permeability $Q_{CO2}$ [GPU] | Separation selectivity | Spiral type |
| Example 11 | 600 | 983 | 33 | A |
| Example 12 | 600 | 988 | 34 | A |
| Comparative Example 10 | 600 | 986 | 15 | C |

TABLE 4

|  | Resin layer Inorganic particles | Separation layer | | | Protective layer | | | | |
|---|---|---|---|---|---|---|---|---|---|
|  |  |  | Inorganic particles | | | Inorganic particles | | | |
|  | Particle diameter/film thickness of resin layer | Resin Type | Type | Addition amount [% by mass] | Resin Type | Type | Addition amount [% by mass] | Particle diameter [nm] | Particle diameter/film thickness of protective layer |
| Example 13 | 0.25 | PI | SAPO34 | 20 | PDMS | SAPO34 | 10 | 250 | 0.25 |
| Example 14 | 0.25 | PI | SAPO34 | 20 | PDMS | SAPO34 | 10 | 375 | 0.25 |

|  | Protective layer | Evaluation | | |
|---|---|---|---|---|
|  | Film thickness [nm] | $CO_2$ permeability $Q_{CO2}$ [GPU] | Separation selectivity | Spiral type |
| Example 13 | 1000 | 895 | 34 | A |
| Example 14 | 1500 | 654 | 32 | A |

TABLE 5

| | Resin layer Inorganic particles | Separation layer | | | Protective layer | | | |
|---|---|---|---|---|---|---|---|---|
| | | Inorganic particles | | | | Inorganic particles | | |
| | Particle diameter/film thickness of resin layer | Resin Type | Type | Addition amount [% by mass] | Resin Type | Type | Addition amount [% by mass] | Particle diameter [nm] | Particle diameter/film thickness of protective layer |
| Example 15 | 0.25 | PI | SAPO34 | 20 | PDMS | SSZ-13 | 10 | 300 | 0.3 |
| Example 16 | 0.25 | PI | SAPO34 | 20 | PDMS | CMS | 10 | 300 | 0.3 |
| Example 17 | 0.25 | PI | SAPO34 | 20 | PDMS | Silica | 10 | 13 | 0.02 |
| Example 18 | 0.25 | PI | SSZ-13 | 10 | PDMS | SAPO34 | 10 | 150 | 0.25 |
| Comparative Example 11 | — | PI | SSZ-13 | 10 | None | — | — | — | — |
| Comparative Example 12 | — | PI | SSZ-13 | 10 | PDMS | — | — | — | — |

| | Protective layer Film thickness [nm] | Evaluation $CO_2$ permeability $Q_{CO2}$ [GPU] | Separation selectivity | Spiral type |
|---|---|---|---|---|
| Example 15 | 600 | 879 | 32 | A |
| Example 16 | 600 | 765 | 34 | A |
| Example 17 | 600 | 879 | 33 | A |
| Example 18 | 600 | 556 | 34 | A |
| Comparative Example 11 | 600 | 543 | 25 | C |
| Comparative Example 12 | 600 | 224 | 28 | A |

TABLE 6

| | Resin layer Inorganic particles | Separation layer | | | Protective layer | | | | |
|---|---|---|---|---|---|---|---|---|---|
| | | Inorganic particles | | | | Inorganic particles | | | |
| | Particle diameter/film thickness of resin layer | Resin Type | Type | Addition amount [% by mass] | Resin Type | Type | Addition amount [% by mass] | Particle diameter [nm] | Particle diameter/film thickness of protective layer |
| Example 19 | Resin layer was not present | PI | SAPO34 | 20 | PDMS | SAPO34 | 10 | 150 | 0.25 |
| Example 20 | Inorganic particles were not contained | PI | SAPO34 | 20 | PDMS | SAPO34 | 10 | 150 | 0.25 |
| Example 21 | 0.2 | PI | SAPO34 | 20 | PDMS | SAPO34 | 10 | 150 | 0.25 |

| | Protective layer Film thickness [nm] | Evaluation $CO_2$ permeability $Q_{CO2}$ [GPU] | Separation selectivity | Spiral type |
|---|---|---|---|---|
| Example 19 | 600 | 521 | 23 | A |
| Example 20 | 600 | 531 | 25 | A |
| Example 21 | 600 | 875 | 31 | A |

As shown in Tables 2 to 6, it was understood that the gas separation membrane of the present invention can be made into a spiral type gas separation membrane module while maintaining high permeability.

As shown in Comparative Examples 1 to 4, it was understood that the "high permeability" and the "gas separation membrane being made into a spiral type gas separation membrane module by improving the brittleness" were not able to be achieved simultaneously even when the amount of inorganic particles to be added to the gas separation layer was increased in a case where a protective layer was not provided.

As shown in Comparative Examples 5 to 8, in a case where inorganic particles were not added to a protective layer, the permeability was degraded when the amount of inorganic particles to be added to the gas separation layer was small and the spiral type was evaluated to be poor when the amount of inorganic particles to be added to the gas separation layer was increased. That is, even in this case, it was understood that the "high permeability" and the "gas separation membrane being made into a spiral type gas separation membrane module by improving the brittleness" were not able to be achieved simultaneously even when the amount of inorganic particles to be added to the gas separation layer was increased.

Further, by comparing Examples 1 to 4 and Comparative Examples 1 to 8 to each other, it was understood that there was an increase in unexpected effects (synergistic effects) when the total amount of inorganic particles to be added to the gas separation layer and the protective layer was set to be the same as the amount of inorganic particles to be added to only the gas separation layer of comparative examples.

As shown in Comparative Example 9, it was understood that the gas separation membrane was not able to be made into a gas separation membrane module when the amount of inorganic particles to be added to the protective layer was larger than the upper limit of the present invention.

As shown in Comparative Example 10, it was understood that the gas separation membrane was not able to be made into a gas separation membrane module when the average particle diameter of inorganic particles to be added to the protective layer was larger than the upper limit of the present invention.

As shown in Comparative Example 11, it was understood that the permeability was degraded when the amount of inorganic particles to be added to the gas separation layer was small and the spiral type was evaluated to be poor when the amount of inorganic particles to be added to the gas separation layer was increased, when the protective layer was not provided even in a case where the type of inorganic particles of the separation layer was changed.

As shown in Comparative Example 12, it was understood that the permeability was degraded when the amount of inorganic particles to be added to the gas separation layer was small and the spiral type was evaluated to be poor when the amount of inorganic particles to be added to the gas separation layer was increased, when inorganic particles were not added to the protective layer even in a case where the type of inorganic particles of the separation layer was changed.

Further, the gas separation membrane of the present invention was large to the extent that the separation selectivity was not practically problematic.

Comparative Example 13

In the preparation of the SAPO-34 particles of Example 1, the amount of pure water was adjusted to prepare SAPO-34 particles having an average particle diameter of less than 10 nm, specifically, 5 nm. At the time of preparation of the SAPO-34 particles, it was difficult to form particles.

Thereafter, a gas separation membrane of Comparative Example 13 was obtained in the same manner as in Example 3 except that the inorganic particle to be added to the polymerizable radiation-curable composition used to form a resin layer and a protective layer were changed to SAPO-34 particles which were prepared according to the above-described method and had an average particle diameter of 5 nm in Example 3.

It was understood that the gas separation membrane of Comparative Example 13 did not exhibit the effects of the present invention. The reason for this was assumed that inorganic particles were easily aggregated when the average particle diameter of the inorganic particles used to form a protective layer was smaller than the lower limit defined in the present invention. Moreover, the results of Comparative Example 13 were not listed in the tables above.

EXPLANATION OF REFERENCES

1: separation layer
2: protective layer
3: resin layer
4: support
5: gas separation membrane
10: separation module (spiral type module for separating out acidic gas)
12: central tube
14: laminate
14a: spiral laminate
16: telescope preventing plate
16a: outer ring portion
16b: inner ring portion
16c: rib
16d: opening portion
18: covering layer
20: acidic gas separation layer
20a: facilitated transport film
20b: porous support
24: member for supply gas channel
26: member for permeating gas channel
30: adhesive layer
30a: adhesive
34: fixing means
36: pinching body
40: adhesive member

What is claimed is:

1. A gas separation membrane comprising:
a support;
a separation layer; and
a protective layer in this order,
wherein the separation layer contains inorganic particles,
the protective layer contains a resin and inorganic particles having an average particle diameter of 10 nm or greater which is less than 0.34 times the film thickness of the protective layer, and
the content of the inorganic particles contained in the protective layer is 40% by mass or less with respect to the content of the resin contained in the protective layer.

2. The gas separation membrane according to claim 1, wherein the inorganic particles contained in the separation layer are an inorganic molecular sieve.

3. The gas separation membrane according to claim 1, wherein the content of the inorganic particles contained in the protective layer is in a range of 1% by mass to 40% by mass with respect to the content of the resin contained in the protective layer.

4. The gas separation membrane according to claim 1, wherein the inorganic particles contained in the separation layer are an inorganic molecular sieve.

5. The gas separation membrane according to claim 1 wherein the film thickness of the protective layer is 1000 nm or less.

6. The gas separation membrane according to claim 1, wherein the resin contained in the protective layer is polysiloxane.

7. The gas separation membrane according to claim 1 wherein the separation layer further includes a resin, and the content of the inorganic particles contained in the separation layer is in a range of 5% by mass to 40% by mass with respect to the content of the resin contained in the separation layer.

8. The gas separation membrane according to claim 1, further comprising:

a resin layer between the support and the separation layer,
wherein the resin layer contains a resin and inorganic particles having an average particle diameter of 10 nm or greater which is less than 0.34 times the film thickness of the resin layer, and
the content of the inorganic particles contained in the resin layer is 40% by mass or less with respect to the content of the resin contained in the resin layer.

9. A gas separation membrane module which uses the gas separation membrane according to claim 1.

10. The gas separation membrane module according to claim 9 which is a spiral type gas separation membrane module.

* * * * *